(12) United States Patent  (10) Patent No.: US 7,297,171 B2
Rosenflanz  (45) Date of Patent: Nov. 20, 2007

(54) METHODS OF MAKING CERAMICS COMPRISING $AL_2O_3$, REO, $ZRO_2$ AND/OR $HFO_2$ AND $NB_2O_5$ AND/OR $TA_2O_5$

(75) Inventor: Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 370 days.

(21) Appl. No.: 10/666,615

(22) Filed: Sep. 18, 2003

(65) Prior Publication Data

US 2005/0060948 A1    Mar. 24, 2005

(51) Int. Cl.
*C09K 3/14* (2006.01)
*B24D 18/00* (2006.01)
*C03C 10/00* (2006.01)
*C03C 10/02* (2006.01)

(52) U.S. Cl. ............... 51/307; 51/309; 51/295; 51/298; 51/297; 51/293; 501/2; 501/10; 264/5; 264/6; 65/33.1; 65/33.9

(58) Field of Classification Search .......... 51/307–309, 51/295, 298, 297, 293; 501/2, 10, 127; 264/5, 264/6, 12, 14; 65/33.1, 33.9
See application file for complete search history.

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, III |
| 2,805,166 A | 9/1957 | Loffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,625,717 A | 12/1971 | Grubba et al. |
| 3,635,739 A | 1/1972 | Macdowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,785,834 A | 1/1974 | Rapp |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |

(Continued)

FOREIGN PATENT DOCUMENTS

AT    333146    10/1976

(Continued)

OTHER PUBLICATIONS

Aguilar, E.A., "Processing and crystallization of rapidly solidified $Al_2O_3$-$Y_2O_3$ fibres", British Ceramic Transactions, 2000, vol. 99, No. 6, pp. 256-259.

Brewer, Luke N. et al., "Internet modification for increased fracture toughness in reaction-formed yttrium aluminum garnet/alumina eutectic composites," 1999, vol. 14, No. 10, pp. 3907-3912.

Brockway et al. "Rapid Solidification of Ceramics a Technology Assessment", *Metals and Ceramics Information Center*, MCIC Report, Jan. 1984 MCIC 84-49.

Chen, Zan-Hwey et al., "Microstructures of laser-treated $Al_2O_3$-$ZrO_2$-$CeO_2$ composites," *Materials Science & Engineering A (Structural Materials: Properties, Microstructure and Processing)*, 1995, vol. A196, No. 1-2, pp. 253-260.

"China: Oversupply Puts Rare Earths Projects On Hold", Industrial Minerals, Aug. 1997, 1 page.

"China's Rare Earth Export Quota Set at 45,000 Tons", Dow Jones Interactive Printout on Jun. 20, 2001 for web address "http://ptg.djnr.com/ccroot/asp/publib/story.asp"; Asia Pulse, Jan. 9, 2001, 1 page.

(Continued)

*Primary Examiner*—Michael Marcheschi
(74) *Attorney, Agent, or Firm*—Gregory D. Allen

(57) ABSTRACT

Methods for making glass-ceramics comprising $Al_2O_3$, REO, at least one of $ZrO_2$ or $HfO_2$ and at least one of $Nb_2O_5$ or $Ta_2O_5$. Glass-ceramics according to the present invention can be made, formed as, or converted into glass beads, articles (e.g., plates), fibers, particles, and thin coatings. Some embodiments of glass-ceramic particles according to the present invention can be are particularly useful as abrasive particles.

61 Claims, 1 Drawing Sheet

U.S. PATENT DOCUMENTS

| | | |
|---|---|---|
| 3,926,603 A | 12/1975 | Plesslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 3,999,994 A | 12/1976 | Rapp |
| 4,014,122 A | 3/1977 | Woods |
| 4,017,317 A | 4/1977 | Rapp |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Perrer |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhoff-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,045,402 A | 9/1991 | Adams, Jr. et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,830 A | 4/1992 | Drouet et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |
| 5,259,147 A | 11/1993 | Falz et al. |
| 5,273,566 A | 12/1993 | Balcar et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,413,974 A | 5/1995 | Yokoyama et al. |
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,484,752 A | 1/1996 | Waku et al. |
| 5,496,386 A | 3/1996 | Broberg et al. |
| 5,498,269 A | 3/1996 | Larmie |
| 5,516,348 A | 5/1996 | Conwell et al. |
| 5,520,711 A | 5/1996 | Helmin |
| 5,534,843 A | 7/1996 | Tsunoda et al. |
| 5,547,479 A | 8/1996 | Conwell et al. |
| 5,549,962 A | 8/1996 | Holmes et al. |
| 5,551,963 A | 9/1996 | Larmie |
| 5,552,213 A | 9/1996 | Eschner |
| 5,569,547 A | 10/1996 | Waku et al. |
| 5,593,467 A | 1/1997 | Monroe |
| 5,605,870 A | 2/1997 | Strom-Olsen et al. |
| 5,609,706 A | 3/1997 | Benedict et al. |
| 5,611,829 A | 3/1997 | Monroe et al. |
| 5,641,469 A | 6/1997 | Garg et al. |
| 5,645,619 A | 7/1997 | Erickson et al. |
| 5,651,925 A | 7/1997 | Ashley et al. |
| 5,653,775 A | 8/1997 | Plovnick et al. |
| 5,665,127 A | 9/1997 | Moltgen et al. |
| 5,679,067 A | 10/1997 | Johnson et al. |

| | | | | | |
|---|---|---|---|---|---|
| 5,682,082 A | 10/1997 | Wei et al. | 2004/0023078 A1 | 2/2004 | Rosenflanz et al. |
| 5,721,188 A | 2/1998 | Sung et al. | 2004/0148868 A1 | 8/2004 | Anderson et al. |
| 5,725,162 A | 3/1998 | Garg et al. | | | |
| 5,733,178 A | 3/1998 | Ohishi | | | |
| 5,738,696 A | 4/1998 | Wu et al. | FOREIGN PATENT DOCUMENTS | | |
| 5,747,397 A | 5/1998 | McPherson et al. | | | |
| 5,763,345 A | 6/1998 | Ohshima et al. | DE | 20 34 011 | 7/1970 |
| 5,782,940 A | 7/1998 | Jayan et al. | DE | 134 638 A | 3/1979 |
| 5,847,865 A | 12/1998 | Gopinath et al. | DE | 141 420 | 4/1980 |
| 5,856,254 A | 1/1999 | Feige et al. | EP | 0 200 487 | 11/1986 |
| 5,863,308 A | 1/1999 | Qi et al. | EP | 0 227 374 | 7/1987 |
| 5,876,470 A | 3/1999 | Abrahamson | EP | 0 236 507 | 9/1987 |
| 5,902,763 A | 5/1999 | Waku et al. | EP | 0 274 838 | 7/1988 |
| 5,903,951 A | 5/1999 | Ionta et al. | EP | 0 291 029 A1 | 11/1988 |
| 5,952,256 A | 9/1999 | Morishita et al. | EP | 0 408 771 A1 | 1/1991 |
| 5,954,844 A | 9/1999 | Law et al. | EP | 0 469 271 | 2/1992 |
| 5,961,674 A | 10/1999 | Gagliardi et al. | EP | 0 480 678 A1 | 4/1992 |
| 5,975,988 A | 11/1999 | Christianson | EP | 0 494 638 | 7/1992 |
| 5,976,274 A | 11/1999 | Inoue et al. | EP | 0 495 536 A2 | 7/1992 |
| 5,981,413 A | 11/1999 | Hale | EP | 0 579 281 A1 | 1/1994 |
| 5,981,415 A | 11/1999 | Waku et al. | EP | 0 601 453 A2 | 6/1994 |
| 6,045,093 A | 4/2000 | Zheng | EP | 0 647 601 A1 | 4/1995 |
| 6,053,956 A | 4/2000 | Wood | EP | 0 666 238 B1 | 8/1995 |
| 6,123,743 A | 9/2000 | Carman et al. | EP | 0 666 239 B1 | 8/1995 |
| 6,128,430 A | 10/2000 | Chu et al. | EP | 0 709 347 | 5/1996 |
| 6,214,429 B1 | 4/2001 | Zou et al. | EP | 0 722 919 A1 | 7/1996 |
| 6,251,813 B1 | 6/2001 | Sato | EP | 0 291 029 B2 | 11/1996 |
| 6,254,981 B1 | 7/2001 | Castle | FR | 1547 989 | 10/1968 |
| 6,268,303 B1 | 7/2001 | Aitken et al. | FR | 2 118 026 | 7/1972 |
| 6,277,161 B1 | 8/2001 | Castro et al. | FR | 2538370 | 6/1984 |
| 6,287,353 B1 | 9/2001 | Celikkaya | FR | 2 609 708 | 7/1988 |
| 6,306,926 B1 | 10/2001 | Bretscher et al. | GB | 793503 | 4/1958 |
| 6,362,119 B1 | 3/2002 | Chiba | GB | 1005338 | 9/1965 |
| 6,447,937 B1 | 9/2002 | Murakawa et al. | GB | 1 121 875 | 7/1968 |
| 6,451,077 B1 | 9/2002 | Rosenflanz | GB | 1 260 933 A | 1/1972 |
| 6,454,822 B1 | 9/2002 | Rosenflanz | GB | 2 116 992 | 10/1983 |
| 6,458,731 B1 | 10/2002 | Rosenflanz | GB | 2 377 438 A | 1/2003 |
| 6,469,825 B1 | 10/2002 | Digonnet et al. | JP | 50025608 | 3/1975 |
| 6,482,758 B1 | 11/2002 | Weber et al. | JP | 59 22 7726 A | 12/1984 |
| 6,482,761 B1 | 11/2002 | Watanabe et al. | JP | 60221338 | 11/1985 |
| 6,484,539 B1 | 11/2002 | Nordine et al. | JP | 61099665 | 5/1986 |
| 6,490,081 B1 | 12/2002 | Feillens et al. | JP | 62-003041 | 1/1987 |
| 6,521,004 B1 | 2/2003 | Culler et al. | JP | 63-156024 | 6/1988 |
| 6,582,488 B1 | 6/2003 | Rosenflanz | JP | 63-303821 | 12/1988 |
| 6,583,080 B1 | 6/2003 | Rosenflanz | JP | 03-113428 A | 5/1991 |
| 6,589,305 B1 | 7/2003 | Rosenflanz | JP | 4-119941 | 4/1992 |
| 6,592,640 B1 | 7/2003 | Rosenflanz et al. | JP | 05-085821 | 4/1993 |
| 6,596,041 B2 | 7/2003 | Rosenflanz | JP | 05-226733 A | 9/1993 |
| 6,607,570 B1 | 8/2003 | Rosenflanz et al. | JP | 06 040765 A | 2/1994 |
| 6,620,214 B2 | 9/2003 | McArdle et al. | JP | 06-171974 | 6/1994 |
| 6,666,750 B1 | 12/2003 | Rosenflanz | JP | 11-189926 | 7/1999 |
| 6,669,749 B1 | 12/2003 | Rosenflanz et al. | JP | 200045128 A | 2/2000 |
| 6,706,083 B1 | 3/2004 | Rosenflanz | JP | 200045129 A | 2/2000 |
| 6,749,653 B2 | 6/2004 | Castro et al. | JP | 2001294480 | 10/2001 |
| 6,818,578 B2 | 11/2004 | Tachiwama | JP | 2003-94414 | 4/2003 |
| 6,833,014 B2 | 12/2004 | Welygan et al. | KR | 9601009 B1 | 1/1996 |
| 2001/0030811 A1 | 10/2001 | Kasai et al. | RU | 1455569 | 10/1996 |
| 2002/0066233 A1 | 6/2002 | McArdle et al. | WO | WO 94/14722 | 7/1994 |
| 2002/0160694 A1 | 10/2002 | Wood et al. | WO | WO 97/16385 | 5/1997 |
| 2003/0040423 A1 | 2/2003 | Harada et al. | WO | WO 97/25284 | 7/1997 |
| 2003/0110706 A1 | 6/2003 | Rosenflanz | WO | WO 00/34201 | 6/2000 |
| 2003/0110707 A1 | 6/2003 | Rosenflanz et al. | WO | WO 01/16047 A2 | 3/2001 |
| 2003/0110708 A1 | 6/2003 | Rosenflanz | WO | WO 01/23321 A1 | 4/2001 |
| 2003/0110709 A1 | 6/2003 | Rosenflanz et al. | WO | WO 01/23323 A1 | 4/2001 |
| 2003/0115805 A1 | 6/2003 | Rosenflanz et al. | WO | WO 01/27046 A1 | 4/2001 |
| 2003/0126802 A1 | 7/2003 | Rosenflanz | WO | WO 01/56946 A | 8/2001 |
| 2003/0126803 A1 | 7/2003 | Rosenflanz | WO | WO 01/56947 A | 8/2001 |
| 2003/0126804 A1 | 7/2003 | Rosenflanz | WO | WO 01/56949 A | 8/2001 |
| 2003/0145525 A1 | 8/2003 | Rosenflanz | | | |
| 2004/0020245 A1 | 2/2004 | Rosenflanz et al. | | | |

| | | | |
|---|---|---|---|
| WO | WO 01/56950 A | 8/2001 | |
| WO | WO 02/08146 A | 1/2002 | |

OTHER PUBLICATIONS

"China's Rare Earth Industry In the Doldrums", Dow Jones Interactive Internet Printout on Jun. 20, 2001 for web address "http://ptg.djnr.com/ccroot/asp/publib/story,asp"; Asia Pulse, Jan. 28, 1999, 2 pages.

"China Rare Earth Information", China Rare Earth Information Center, vol. 6, No. 4, Aug. 2000, 3 pages.

Coutures et al., "Production and Studies of Alumina Based Refractory Glass," *Mat. Res. Bull.*, vol. 10, No. 6, 1975, pp. 539-546.

Dialog © file 319: Chem Bus NewsBase © 2001 Royal Soc Chemistry. Abstract for "China: Oversupply Puts Rare Earths Projects On Hold", Industrial Minerals n 359, p. 10.

"Elements: China to Impose Quotas on Rare Earth Exports", Dow Jones Interactive Internet Printout on Jun. 20, 2001 for web address "http://ptg.djnr.com/ccroot/asp/publib/story.asp"; Chemical Business NewsBase, Feb. 2, 1999, 1 page.

Figs. 311, 346, 350, 354-56, 373, and 716, *Phase Diagrams For Ceramists*, The American Ceramic Society, 1964, pp. 122, 136, 138, 140, 144, 248.

Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5257, 5418, and 5437, *Phase Diagrams For Ceramists*, vol. IV, The American Ceramic Society, 1981, pp. 29, 152, 127, 129-131, 133, 135-137, 139, 141, 143, 220, 228.

Fig. 6464, *Phase Diagrams For Ceramists, vol. VI*, The American Ceramic Society, 1981, p. 162.

Figs. 9262, and 9264, *Phase Diagrams For Ceramists, vol. XI, Oxides*, The American Ceramic Society, 1995, pp. 105-106.

Harris et al., "Durable 3—5 μm Transmitting Infrared Window Materials," Infrared Physics & Technology 39, 1998, pp. 185-201.

Hedrick, J. , "Rare-Earth Metals", pp. 61.1-61.6, 1997.

Hedrick, J., "Rare-Earth Metal Prices in the USA ca. 1960 to 1994", J. Alloys and Compounds, 1997, pp. 471-481.

Hrovat et al., "Preliminary data on subsolidus phase equilibria in the $La_2O_3$-$Al_2O_3$-$Mn_2O_3$ and $La_2O_3$-$Al_2O_3$-$Fe_2O_3$ systems", *Journal of Materials Science Letters*, vol. 14, 1995, pp. 265-267.

Imakoa, Minoru et al., "Refractive Index and Abbe's Number of Glass of Lanthanum Borate System", Journal Ceramic Assoc. Japan, vol. 70, No. 5, (1962), pp. 115.

"In Asia", Dow Jones Interactive Internet Printout on Jun. 20, 2001 for web address "http://ptg.djnr.com/ccroot/asp/publib/story.asp"; Engineering & Mining Journal, Feb. 28, 2000, 4 pages.

Isobe, T. et al., "Microstructure and Thermal Stability of $Al_2O_3$/$Y_3Al_5O_{12}$ (YAG) Eutectic Composite Prepared by an Arc Discharge Method", J. Ceram. Soc. Jap., 109, [1], 2001, pp. 66-70, Abstract in English.

Kingery, W.D., Introduction to Ceramics, Second Edition, Chpt. III subchapter 8.8, Glass-Ceramic Materials, pp. 368-374, (1976).

Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970) 125-134.

Kondrashov VI et al., "Opacified Glass "Decorit" Synthesis Directions", Steklo I Keramika 2001, No. 1, pp. 8-11. Title translated by Keramika as "Aspects of Synthesis of Decorite Opacified Glass".

Krell, Andreas et al., "Advances in the Grinding Efficiency of Sintered Alumina Abrasives," *Journal of the American Ceramic Society*, 1996, vol. 79, No. 3, pp. 763-769.

Krokhin et al., "Synthesis of Y-Al Garnet", *Glass and Ceramics*, vol. 55, Nos. 5-6, 1998, pp. 151-152.

Lakiza et al., "The Liquidus Surface In The $Al_2O_3$-$ZrO_2$-$Y_2O_3$ Phase Diagram", *Powder Metallurgy and Metal Ceramics*, vol. 33, No. 11-12, 1994, pp. 595-597.

Lakiza et al., "Methods Of Investigation Of Properties Of Powder Materials, Interactions In The $Al_2O_3$-$ZrO_2$-$Y_2O_3$ System", *Powder Metallurgy and Metal Ceramics*, vol. 33, Nos. 9-10, 1994, pp. 486-490.

Lakiza et al., "Powder-Material Research Methods And Properties Polythermal Sections Of The $Al_2O_3$-$ZrO_2$-$Y_2O_3$ Phase Diagram", *Powder Metallurgy and Metal Ceramics*, vol. 34, No. 11-12, 1995, pp. 655-659.

Lakiza et al., "Solidus Surface And Phase Equilibria During The Solidification Of Alloys In The $Al_2O_3$-$ZrO_2$-$Y_2O_3$ System", *Powder Metallurgy and Metal Ceramics*, vol. 34, Nos. 1-2, 1995, pp. 64-67.

Lakiz and Lopato, "Metastable Phase Relationships In The System $Al_2O_3$-$ZrO_2$-$Y_2O_3$", *Powder Metallurgy and Metal Ceramics*, vol. 35, Nos. 11-12, 1996, pp. 621-626.

Mah, Tai-ll et al., "Processing, Microstructure, and Strength of Alumina-YAG Eutectic Polycrystals", J. Am. Ceram. Soc., 83, [8], 2000, pp. 2088-2090.

McKittrick, Joanna, et al., "Non-stoichiometry and defect structures in rapidly solidified MgO-$Al_2O_3$-$ZrO_2$ ternary eutectics," *Materials Science and Engineering* A231 (1997) 90-97.

"Phase Identification of $Al_2O_3$/$RE_3Al_5O_{12}$ and $Al_2O_3$/$REAlO_3$ (RE=Sm-Lu, Y) Eutectics", J. Crystal Growth, 218, 2000, pp. 67-73.

"Prices: Minerals", Asian Ceramics & Glass, Jan. 2001, 2 pages.

"Rare Earths: An Industry Review and Market Outlook—Part 1", Dow Jones Interactive Internet Printout on Jun. 20, 2001 for web address "http://ptg.djnr.com/ccroot/asp/publib/story.asp"; Chemical Business NewsBase, Dec. 8, 2000, 2 pages.

"Rare Earth—Market Confusion Inevitable Due to China's Unstable Supply", Japan Chemical Week, vol. 41, No. 2080, Jul. 6, 2000, pp. 6-7.

"Rare Earth Prices and Market Outlook", Dow Jones Interactive Internet Printout on Jun. 20, 2001 for web address "http://ptg.djnr.com/ccroot/asp/publib/story.asp"; Chemical Business NewsBase, May 27, 1999, 2 pages.

Rodriquez, Louise, "Rare Earths Prices Recover Despite China's Overcapacity", America Metal Market, vol. 109, No. 14, Jan. 22, 2001, p. 13.

Shishido et al., "$Gd_3Al_5O_{12}$ Phase Obtained by Crystallization of Amorphous $Gd_2O_3$·5/3 $Al_2O_3$," *Journal of the American Ceramic Society*, vol. 61, No.7-8, Jul.-Aug. 1978, pp. 373-374.

Stankus, S. V. et al., "Crystallization and Thermal Properties of $Al_2O_3$-$Y_2O_3$ Melts", J. Crystal Growth, 167, 1996, pp. 165-170.

Stookey. S. D., Ceramics Made by Nucleation of Glass-Comparison of Microstructure and Properties with Sintered Ceramics, The American Ceramic Society, (1992), pp. 1-4.

Suzuki et al., "Rapid Quenching on the Binary Systems of High Temperature Oxides, "*Mat. Res. Bull.*, vol. 9, 1974, pp. 745-754.

Toropov et al., "Phase Equilibria in the Yttrium Oxide-Alumina System", *Bulletin of the Academy of Sciences, USSR*, Division of Chemical Science, No. 7, Jul. 1964, pp. 1076-1081, A translation of *Seriya Khimicheskaya*.

"Traders' View on Chemical Business (Part 2): Rare Earth: Market Confusion Inevitable Due to China's Unstable Supply", Dow Jones Interactive Internet Printout on Jun. 20, 2001 for web address "http://ptg.djnr.com/ccroot/asp/publib/story.asp"; Chemical Business NewsBase, Aug. 10, 2000, 2 pages.

Varshneya, Arun K., "Fundamentsal of Inorganic Glasses", pp. 425-427 (1994).

van den Hoven et al., "Net Optical Gain at 1.53 μm in Er-DOPED $Al_2O_3$ Waveguides on Silicon," Appl. Phys. Lett. 68 (14), Apr. 1, 1966, pp. 1886-1888.

Volkova, I. Yu et al., Abstract for "Kinetics of Nonisothermal Sintering of Some Eutectic Oxide Compositions," 1986 (abstract from Database Chemabs 'Online! Chemical Abstracts Service, Columbus, Ohio, US).

Waku et al., "A ductile ceramic eutectic composite with high strength at 1,873 K", *Nature*, vol. 389, Sep. 1997, pp. 49-52.

Waku, Yoshiharu, "A New Ceramic Eutectic Composite with High Strength at 1873 K", *Advanced Materials*, vol. 10, No. 8, 1998, pp. 615-617.

Waku et al., "High-temperature strength and thermal stability of a unidirectionally solidified $Al_2O_3$/YAG eutectic composite", pp. 1217-1225.

Waku et al., "Sapphire matrix composited reinforced with single crystal VAG phases", *Journal of Materials Science*, vol. 31, 1996, pp. 4663-4670.

Waku, Yoshiharu, et al., "A jelly-like ceramic fiber at 1193 K", *Mat Res Innovat*, 2000, vol. 3, pp. 185-189.

Wang, S. et al., "Divorced Eutectic and Interface Characteristics in a Solidified YAG-Spinal Composite With Spinel-Rich Composition", J. Mat. Sci., 35, 2000, pp. 2757-2761.

Wang, Shuqiang et al., "Eutectic Precipitation of the Spinel Solid Solution-Yttrium Aluminum Garnet (YAG) System," *Journal of the American Ceramic Society*, 1998, vol. 81, No. 1, pp. 263-265.

Weber et al., Device Materials Based on Er-, Ho-, Tm-, and Yb-Doped Rare Earth Aluminum Oxide (REA1™) Glass, reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).

Weber et al., "Rare Earth Oxide-Aluminum Oxide Glasses for Mid-Range IR Devices," reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

Weber, J.K. Richard et al., "Glass fibres of pure and erbium- or neodymium-doped yttria-alumina compositions", Nature, Jun. 25, 1998, vol. 393, pp. 769-771.

Weber, J.K. Richard et al., "Glass Formation and Polyamorphism in Rare-Earth Oxide-Aluminum Oxide Compositions", J. American Ceramic Society, 83 [8], 2000, 1868-1872.

Yajima et al., Glass Formation in the Ln-Al-O System, (Ln: Lanthanoid and Yttrium Elements), Chemistry Letters, 1973, pp. 1327-1330.

Yajima et al., "Unusual Glass Formation in the Al-Nd-O System," Chemistry Letters (published by the Chemical Society of Japan), 1973, pp. 741-742.

Yan et al., "Erbium-Doped Phosphate Glass Waveguide on Silicon with 4.1 dB/cm Gain at 1.535 µm," Appl. Phys. Lett, 71(20), Nov. 17, 1997.

Yang and Zhu, "Thermo-Mechanical Stability Of Directionally Solidified $Al_2O_3$-$ZrO_2(Y_2O_3)$ Eutectic Fibers", *Scripta Materialia*, vol. 36, No. 8, 1997, pp. 961-965.

Yau, W., "Increase in Value of Rare Earth Products Boosts Yixing Xinwei", South China Morning Post, Apr. 12, 2000, 2 pages.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled, "Method of Making Ceramic Articles", filed Aug. 2, 2002, Rosenflanz having U.S. Appl. No. 10/211,481.

U.S. Patent Application entitled "Methods of Making Ceramic Particles,"filed Feb. 5, 2003, Rosenflanz, having a U.S. Appl. No. 10/358,772.

U.S. Patent Application entitled "Methods of Making Ceramics", filed Feb. 5, 2003, Anderson et al., having a U.S. Appl. No. 10/358,765.

U.S. Patent Application entitled "Ceramics and Methods of Making the Same", filed Feb. 5, 2003, Celikkaya et al., having a U.S. Appl. No. 10/358,910.

U.S. Patent Application entitled "$Al_2O_3$-$La_2O_3$-$Y_2O_3$-MgO Ceramics, and Methods of Making the Same", filed Feb. 5, 2003, Celikkaya et al., having a U.S. Appl. No. 10/358,855.

U.S. Application entitled "Use of Ceramics In Dental And Orthodontic Applications", filed Feb. 5, 2003, having U.S. Appl. No. 10/358,856.

U.S. Application entitled "Methods of Making $Al_2O_3$-$SiO_2$ Ceramics", filed Feb. 5, 2003, Celikkaya et al. having a U.S. Appl. No. 10/358,708.

U.S. Application entitled "Use of Glasses Containing Rare Earth Oxide, Alumina, and Zirconia And Dopant In Optical Waveguides", filed Apr. 28, 2003, having U.S. Appl. No. 10/425,039.

U.S. Application entitled "Methods of Making Ceramic Particles", filed Sep. 5, 2003, having U.S. Appl. No. 10/655,729.

U.S. Application entitled "Ceramics Comprising $Al_2O_3$, REO, $ZrO_2$ and/or $HfO_2$, and $Nb_2O_5$ and/or $Ta_2O_5$, and Methods of Making the Same", filed Sep. 18, 2003, having U.S. Appl. No. 10/666,212.

U.S. Application entitled "Ceramics Comprising $Al_2O_3$, $Y_2O_3$, $ZrO_2$ and/or $HfO_2$, and $Nb_2O_5$ and/or $Ta_2O_5$, and Methods of Making The Same", filed Sep. 18, 2003, having U.S. Appl. No. 10/666,098.

U.S. Application entitled "Agglomerate Abrasive Grain and a Method of Making the Same", filed Feb. 11, 2004, having U.S. Appl. No. 10/776,156.

Aasland and McMillan, Nature 369, 633 (1994).

Aguilar et al, "Melt Extraction Processing of Structural $Y_2O_3$-$Al_2O_3$ Fibers", J. Eur. Ceram. Soc. 20 1091-1098 (2000).

Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.

Gonzalez, Eduardo J., et al., "High Pressure Compaction and Sintering of Nano-Size $\gamma$-$Al_2O_3$ Powder", *Materials and Manufacturing Processes* vol. 11, No. 6, 951-967, 1996.

Jantzen, C.M., Krepski, R.P., & Herman, H., "Ultra-Rapid Quenching of Laser-Method Binary and Unary Oxides", *Mat. Res. Bull.* 15, 1313-1326 (1980).

Khor K.A., "Novel ZrO2-Mullite Composites Produced By Plasma Spraying", Proceedings of the 15th International Thermal Pray Conference, May 25-29, 1998, Nice, France.

Ray, C.S. and Day, D.E., "Determining the Nucleation Rate Curve for Lithium Disilicate Glass by Differential Thermal Analysis", J. Am. Ceram. Soc. 73(2) 439-442 (1990).

Schmucker, M, et al., "Constitution of Mullite Glasses Produced by Ultra-Rapid Quenching of Plasma-Sprayed Melts", Journal of the European Ceramic Society 15 (1995) 1201-1205.

Sarjeant, P.T, & Roy, R., in *Reactivity of Solids* (ed. J. W. Mitchell, R.C., DeVries, R.W., Roberts and P. Cannon) 725-33 (John Wiley & Sons, Inc., New York 1969).

Takamori, T., & Roy, R., "Rapid Crystallization of $SiO_2$-$Al_2O_3$ Glasses", Journal of American Society, vol. 56, No. 12, Dec. 1973.

Weber et al., "Synthesis and Optical Properties of Rare-Earth-Aluminum Oxide Glasses", J. Am. Ceram. Soc. 85(5) 1309-1311 (2002).

Wilding, M.C., McMillan, P.F., "Polyamorphic Transitions in Yttria-Alumina Liquids", *J. Non-Cryst. Solids.* 293-295, 357-365 (2001).

U.S. Application entitled "Ceramics, and Methods of Making and Using the Same", filed Jul. 29, 2004.

U.S. Application entitled "Method of Making Ceramic Articles", filed Jul. 29, 2004.

U.S. Application entitled "Alumina-Yttria Particles and Methods of Making The Same", filed Dec. 18, 2003, having U.S. Appl. No. 10/740,262.

U.S. Application entitled "Method of Making Abrasive Particles", filed Dec. 18, 2003, having U.S. Appl. No. 10/739,420.

U.S. Application entitled "Method of Making Abrasive Particles,"filed Dec. 18, 2003, having U.S. Appl. No. 10/739,624.

U.S. Application entitled "Transparent Fused Crystalline Ceramics, And Method of Making The Same", filed Dec. 18, 2003, having U.S. Appl. No. 10/739,439.

U.S. Application entitled "Method of Making Abrasive Particles", filed Dec. 18, 2003, having U.S. Appl. No. 10/739,440.

U.S. Application entitled "Method of Making Abrasive Particles", filed Dec. 18, 2003, having U.S. Appl. No. 10/740,096.

U.S. Application entitled "Method of Making Abrasive Particles", filed Dec. 18, 2003, having U.S. Appl. No. 10/739,441.

U.S. Application entitled "Power Feeding Method and Apparatus", filed Dec. 18, 2003, having U.S. Appl. No. 10/739,233.

US 7,297,171 B2

METHODS OF MAKING CERAMICS COMPRISING $AL_2O_3$, REO, $ZRO_2$ AND/OR $HFO_2$ AND $NB_2O_5$ AND/OR $TA_2O_5$

BACKGROUND

A number of amorphous (including glass) and glass-ceramic compositions are known. Many oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glasses can be heat-treated to form glass ceramics.

Many properties of known glasses and glass-ceramics may be limited by the intrinsic properties of glass-formers. For example, for $SiO_2$, $B_2O_3$, and $P_2O_5$-based glasses and glass-ceramics, the Young's modulus, hardness, and strength are typically limited by such glass formers. These glass and glass-ceramics generally have inferior mechanical properties as compared, for example, to $Al_2O_3$ or $ZrO_3$.

In another aspect, in general, during most ceramic processing operations, it is desirable to obtain maximum densification with minimum grain size (e.g. without significant crystal growth). Exemplary ceramic processing techniques that may lead to minimizing grain size include decreasing crystal growth rate. Although not wanting to be bound by theory, in general, it is believed in the ceramic art that larger crystal sizes lead to reduced mechanical properties while finer average crystallite sizes lead to improved mechanical properties (e.g., higher strength and higher hardness).

SUMMARY

In one aspect, the present invention provides glasses and glass-ceramics comprising $Al_2O_3$, REO, at least one of $ZrO_2$ or $HfO_2$, and at least one of $Nb_2O_5$ or $Ta_2O_5$. Surprisingly, Applicant has discovered that the addition of $Nb_2O_5$ and/or $Ta_2O_5$ to glasses described herein can significantly influence the crystallization of the glasses.

In some embodiments, the present invention provides a method for making a glass-ceramic, the method comprising heat-treating glass (in some embodiments, ceramic comprising glass) to convert at least a portion of the glass to crystalline ceramic and provide glass-ceramic, the glass comprising at least 35 (in some embodiments, at least 40, 45, 50, 55, 60, 65, 70, or even at least 75; in some embodiments, in a range from 35 to 75, 40 to 75, 45 to 75, 50 to 75, 55 to 75, or even from 60 to 75) percent by weight $Al_2O_3$, based on the total weight of the glass, REO (e.g., $Gd_2O_3$, $La_2O_3$, and/or $Nd_2O_3$; in some embodiments, at least 0.5, 1, 2, 3, 4, 5, or even at least 10; in some embodiments, in a range from 0.5 to 70, 1 to 70, 5 to 70, 10 to 70, 0.5 to 50, 1 to 50, 5 to 50, 10 to 50, 0.5 to 40, 1 to 40, 5 to 40, 10 to 40, 0.5 to 30, 1 to 30, 5 to 30, 10 to 30, 0.5 to 25, 1 to 25, 5 to 25, or even from 10 to 25 percent by weight REO, based on the total weight of the glass), and $ZrO_2$ (in some embodiments, $ZrO_2$ and/or (including collectively) $HfO_2$) (in some embodiments, at least 5, 10, 15, or even at least 20; in some embodiments, in a range from 5 to 30, 5 to 25, 10 to 25, 10 to 30, 15 to 30, 20 to 30, 15 to 25, or even from 15 to 20 percent by weight $ZrO_2$ (in some embodiments, $ZrO_2$ and/or (including collectively) $HfO_2$), based on the total weight of the glass), and at least one of $Nb_2O_5$ or $Ta_2O_5$ (in some embodiments, at least 1, 2, 3, 4, 5, 10, 15, 20, or even at least 25; in some embodiments, in a range from 1 to 20, 5 to 20, 10 to 20, or even from 5 to 15 percent by weight at least one of $Nb_2O_5$ or $Ta_2O_5$, based on the total weight of the glass), wherein the glass contains not more than 10 (in some embodiments, not more than 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of at least one of crystalline $ZrO_2$ or crystalline $HfO_2$ formation from the glass (in some embodiments, by at least a factor of 1.5, 2, 2.5, or even at least 3 as compared to a comparative glass-ceramic made by heat-treating, in the same manner, the same glass free of $Nb_2O_5$ and $Ta_2O_5$ (i.e., the comparative glass is made and heat-treated the same manner as the glass comprising the $Al_2O_3$, REO, at least one of $ZrO_2$ or $HfO_2$, and $Nb_2O_5$ and/or $Ta_2O_5$ except no $Nb_2O_5$ or $Ta_2O_5$ was used to make the glass (i.e., such glass contains zero percent by weight $Nb_2O_5$ or $Ta_2O_5$, based on the total weight of the glass)). The increased rate of crystalline $ZrO_2$ and/or crystalline $HfO_2$ formation from the glass is determined as described below in Example 1. In some embodiments, the method further comprises crushing the glass-ceramic to provide abrasive particles. In some embodiments, the method further comprises grading the abrasive particles to provide a plurality of particles having a specified nominal grade. In some embodiments, the method further comprises incorporating the abrasive particles into an abrasive article.

Some embodiments of glass-ceramics made according to the present invention, and glasses used to make such glass-ceramics, the glass-ceramics and glass may further comprise at least one additional metal oxide (e.g., $Y_2O_3$, MgO, $TiO_2$, $Cr_2O_3$, CuO, SrO, $Li_2O$, NiO, and/or $Fe_2O_3$).

For some embodiments, glass-ceramics made according to the present invention, and glasses used to make such glass-ceramics, contain not more than 20 (in some embodiments, less than 15, 10, 5, 4, 3, 2, 1, 0.5, 0.1, or even zero) percent by weight $SiO_2$ and not more than 20 (in some embodiments, not more than 15, 10, 5, 4, 3, 2, 1, 0.5, 0.1, or even zero) percent by weight $B_2O_3$, based on the total weight of the glass-ceramic or glass, respectively.

Some embodiments of glass-ceramics according to the present invention may comprise the glass of the glass-ceramic in an amount, for example, of at least 1, 2, 3, 5, 10, 15, 20, 25, 30, 35, 40, 45, 50, 55, 60, 65, 70, 75, 80, 85, 90, or even 95 percent by volume, based on the total volume of the glass-ceramic. Some embodiments of glass-ceramics according to the present invention may comprise the crystalline ceramic of the glass-ceramic in an amount, for example, of at least 5, 10, 15, 20, 25, 30, 35, 40, 45, 50, 55, 60, 65, 70, 75, 80, 85, 90, 95, 97, 98, 99, or even 100 percent by volume, based on the total volume of the glass-ceramic.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes glass, crystalline ceramic, glass-ceramic, and combinations thereof;

"complex metal oxide" refers to a metal oxide comprising two or more different metal elements and oxygen (e.g., $CeAl_{O18}$, $Dy_3Al_5O_{12}$, $MgAl_2O_4$, and $Y_3Al_5O_{12}$);

"complex $Al_2O_3$ metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3$ $Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$ REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramic comprising crystals formed by heat-treating glass;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$ metal oxide, etc.) is crystalline, for example, in a glass-ceramic, it may be crystalline, or portions glass and portions crystalline. For example, if a glass-ceramic comprises $Al_2O_3$ and $ZrO_2$, the $Al_2O_3$ and $ZrO_2$ may each be in a glass state, crystalline state, or portions in a glass state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$ metal oxides).

Some embodiments of glass-ceramics made according to the present invention can be made, formed as, or converted into beads (e.g., beads having diameters of at least 1 micrometer, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm), articles (e.g., plates), fibers, particles, and coatings (e.g., thin coatings). Embodiments of the beads can be useful, for example, in reflective devices such as retro-reflective sheeting, alphanumeric plates, and pavement markings. Embodiments of the particles and fibers are useful, for example, as thermal insulation, filler, or reinforcing material in composites (e.g., ceramic, metal, or polymeric matrix composites). Embodiments of the thin coatings can be useful, for example, as protective coatings in applications involving wear, as well as for thermal management. Examples of articles according of the present invention include kitchenware (e.g., plates), dental brackets, and reinforcing material (e.g., particles and fibers), cutting tool inserts, abrasive materials, and structural components of gas engines, (e.g., valves and bearings). Exemplary embodiments of other articles include those having a protective coating of glass-ceramic on the outer surface of a body or other substrate. Certain glass-ceramic particles made according to the present invention can be particularly useful as abrasive particles. The abrasive particles can be incorporated into an abrasive article, or used in loose form.

Abrasive particles are usually graded to a given particle size distribution before use. Such distributions typically have a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles made according to the present invention. In some embodiments, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles made according to the present invention, based on the total weight of the plurality of abrasive particles.

In another aspect, the present invention provides an abrasive article (e.g., a bonded abrasive article, a non-woven abrasive article, or a coated abrasive article) comprising a binder and a plurality of abrasive particles, wherein at least a portion of the abrasive particles are the abrasive particles made according to the present invention.

In some embodiments, the present invention provides a method for making abrasive particles, the method comprising heat-treating glass particles to convert at least a portion of the glass to crystalline ceramic and provide glass-ceramic and the abrasive particles, the glass comprising at least 35 (in some embodiments, at least 40, 45, 50, 55, 60, 65, 70, or even at least 75; in some embodiments, in a range from 35 to 75, 40 to 75, 45 to 75, 50 to 75, 55 to 75, or even from 60 to 75) percent by weight $Al_2O_3$, based on the total weight of the glass, REO (e.g., $Gd_2O_3$, $La_2O_3$, and/or $Nd_2O_3$; in some embodiments, at least 0.5, 1, 2, 3, 4, 5, or even at least 10; in some embodiments, in a range from 0.5 to 70, 1 to 70, 5 to 70, 10 to 70, 0.5 to 50, 1 to 50, 5 to 50, 10 to 50, 0.5 to 40, 1 to 40, 5 to 40, 10 to 40, 0.5 to 30, 1 to 30, 5 to 30, 10 to 30, 0.5 to 25, 1 to 25, 5 to 25, or even from 10 to 25 percent by weight REO, based on the total weight of the glass), $ZrO_2$ (in some embodiments, $ZrO_2$ and/or (including collectively) $HfO_2$) (in some embodiments, at least 5, 10, 15, or even at least 20; in some embodiments, in a range from 5 to 30, 5 to 25, 10 to 25, 10 to 30, 15 to 30, 20 to 30, 15 to 25, or even from 15 to 20 percent by weight $ZrO_2$ (in some embodiments, $ZrO_2$ and/or (including collectively) $HfO_2$), based on the total weight of the glass), and at least one of $Nb_2O_5$ or $Ta_2O_5$ (in some embodiments, at least 1, 2, 3, 4, 5, 10, 15, 20, or even at least 25; in some embodiments, in a range from 1 to 20, 5 to 20, 10 to 20, or even from 5 to 15 percent by weight at least one of $Nb_2O_5$ or $Ta_2O_5$, based on the total weight of the glass), wherein the glass contains not more than 10 (in some embodiments, not more than 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of at least one of crystalline $ZrO_2$ or crystalline $HfO_2$ formation from the glass (in some embodiments, by at least a factor of 1.5, 2, 2.5, or even at least 3) as compared to a comparative glass-ceramic made by heat-treating, in the same manner, the same glass free of $Nb_2O_5$ and $Ta_2O_5$. In some embodiments, the method further comprises grading the abrasive particles to provide a plurality of particles having a specified nominal grade. In some embodiments, the method further comprises incorporating the abrasive particles into an abrasive article.

In some embodiments, the present invention provides a method for making abrasive particles, the method comprising heat-treating particles comprising glass to convert at least a portion of the glass to crystalline ceramic and provide glass-ceramic and the abrasive particles, the glass comprising at least 35 (in some embodiments, at least 40, 45, 50, 55, 60, 65, 70, or even at least 75; in some embodiments, in a range from 35 to 75, 40 to 75, 45 to 75, 50 to 75, 55 to 75, or from even 60 to 75) percent by weight $Al_2O_3$, based on the total weight of the glass, REO (e.g., $Gd_2O_3$, $La_2O_3$, and/or $Nd_2O_3$; in some embodiments, at least 0.5, 1, 2, 3, 4, 5, or even at least 10; in some embodiments, in a range from 0.5 to 70, 1 to 70, 5 to 70, 10 to 70, 0.5 to 50, 1 to 50, 5 to 50, 10 to 50, 0.5 to 40, 1 to 40, 5 to 40, 10 to 40, 0.5 to 30, 1 to 30, 5 to 30, 10 to 30, 0.5 to 25, 1 to 25, 5 to 25, or even from 10 to 25 percent by weight REO, based on the total weight of the glass), $ZrO_2$ (in some embodiments, $ZrO_2$ and/or (including collectively) $HfO_2$) (in some embodiments, at least 5, 10, 15, or even at least 20; in some embodiments, in a range from 5 to 30, 5 to 25, 10 to 25, 10 to 30, 15 to 30, 20 to 30, 15 to 25, or even from 15 to 20 percent by weight $ZrO_2$ (in some embodiments, $ZrO_2$ and/or (including collectively) $HfO_2$), based on the total weight of the glass), and at least one of $Nb_2O_5$ or $Ta_2O_5$ (in some embodiments, at least 1, 2, 3, 4, 5, 10, 15, 20, or even at least 25; in some embodiments, in a range from 1 to 20, 5 to 20, 10 to 20, or even from 5 to 15 percent by weight at least one of $Nb_2O_5$ or $Ta_2O_5$, based on the total weight of the glass), wherein the glass contains not more than 10 (in some embodiments, not more than 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of at least one of crystalline $ZrO_2$ or $HfO_2$ formation from the glass (in some embodiments, by at least a factor of 1.5, 2, 2.5, or even at least 3) as compared to a comparative glass-ceramic made by heat-treating, in the same manner, the same glass free of $Nb_2O_5$ and $Ta_2O_5$. In some embodiments, the method further comprises grading the abrasive particles to provide a plurality of particles having a specified nominal grade. In some embodiments, the method further comprises incorporating the abrasive particles into an abrasive article.

Abrasive articles comprise binder and a plurality of abrasive particles, wherein at least a portion of the abrasive particles are the abrasive particles made according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles made according to the present invention, based on the total weight of the abrasive particles in the abrasive article.

The present invention also provides a method of abrading a surface, the method comprising:

contacting abrasive particles made according to the present invention with a surface of a workpiece; and
moving at least one of the abrasive particles made according to the present invention or the contacted surface to abrade at least a portion of the surface with at least one of the abrasive particles made according to the present invention.

DETAILED DESCRIPTION

Figure 1:
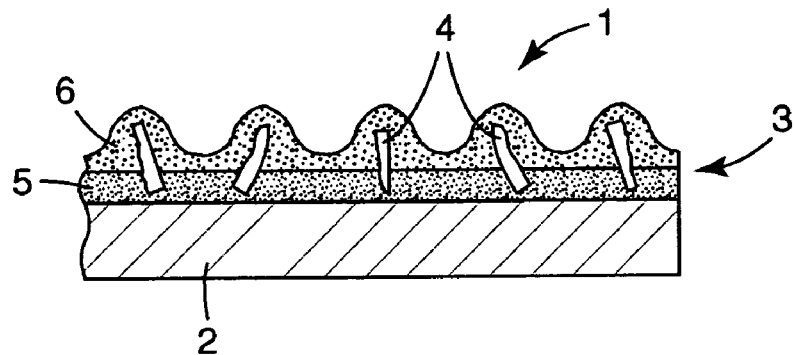
FIG. 1 is a fragmentary cross-sectional schematic view of a coated abrasive article including abrasive particles made according to the present invention.

The present invention relates to glasses and glass-ceramics comprising at least one of $Nb_2O_5$ or $Ta_2O_5$, and methods for making the same. The glasses are prepared by selecting the raw materials, the desired composition, and the processing technique(s).

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$ metal oxides (e.g., $Dy_3Al_5O_{12}$, $Y_3Al_5O_{12}$, $CeAl_{11}O_{18}$, etc.)).

Sources, including commercial sources, of $Nb_2O_5$ include niobium oxide powders, niobium containing ores (e.g., columbite, tantalite, and euxelite), niobium salts, niobium metals, and combinations thereof.

Sources, including commercial sources, of $Ta_2O_5$ include tantalum oxide powders, tantalum containing ores (e.g., columbite, tantalite, and euxelite), tantalum salts, tantalum metals, and combinations thereof.

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide other metal oxides (e.g., $Dy_3Al_5O_{12}$, $CeAl_{11}O_{18}$, etc.)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the HfO$_2$ source may contain, or provide HfO$_2$, as well as other metal oxides such as ZrO$_2$.

For embodiments comprising ZrO$_2$ and HfO$_2$, the weight ratio of ZrO$_2$:HfO$_2$ may be in a range of 1:zero (i.e., all ZrO$_2$; no HfO$_2$) to zero:1, as well as, for example, at least about 99, 98, 97, 96, 95, 90, 85, 80, 75, 70, 65, 60, 55, 50, 45, 40, 35, 30, 25, 20, 15, 10, and 5 parts (by weight) ZrO$_2$ and a corresponding amount of Hfo$_2$ (e.g., at least about 99 parts (by weight) ZrO$_2$ and not greater than about 1 part HfO$_2$) and at least about 99, 98, 97, 96, 95, 90, 85, 80, 75, 70, 65, 60, 55, 50, 45, 40, 35, 30, 25, 20, 15, 10, and 5 parts HfO$_2$ and a corresponding amount of ZrO$_2$.

Other useful metal oxides may also include, on a theoretical oxide basis, BaO, CaO, Cr$_2$O$_3$, CoO, Fe$_2$O$_3$, GeO$_2$, Li$_2$O, MgO, MnO, NiO, Na$_2$O, Sc$_2$O$_3$, SrO, TiO$_2$, ZnO, Y$_2$O$_3$, and combinations thereof. Sources, including commercial sources, include the oxides themselves, metal powders, complex oxides, ores, carbonates, acetates, nitrates, chlorides, hydroxides, etc. For example, sources, including commercial sources, of (on a theoretical oxide basis) Y$_2$O$_3$ include yttrium oxide powders, yttrium, yttrium-containing ores, and yttrium salts (e.g., yttrium carbonates, nitrates, chlorides, hydroxides, and combinations thereof). The Y$_2$O$_3$ source may contain, or only provide, Y$_2$O$_3$. Alternatively, the Y$_2$O$_3$ source may contain, or provide Y$_2$O$_3$, as well as one or more metal oxides other than Y$_2$O$_3$ (including materials of or containing complex Y$_2$O$_3$ metal oxides (e.g., Y$_3$Al$_5$O$_{12}$)).

In some embodiments, it may be advantageous for at least a portion of a metal oxide source (in some embodiments, 10, 15, 20, 25, 30, 35, 40, 45, 50, 55, 60, 65, 70, 75, 80, 85, 90, 95, or even 100 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise combining them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates, minimizes, or at least reduces insufficient heat transfer, and hence facilitates formation and homogeneity of the melt, particularly when forming glass particles with x, y, and z dimensions over 50 (over 100, or even over 150) micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or not practical due to high melting point of the materials. Further, the presence of the additional heat generated by the oxidation reaction actually enables the formation of glass that otherwise could not be made, or could not be made in the desired size range. Another advantage of the invention includes, in forming the glasses, that many of the chemical and physical processes such as melting, densification and spherodizing can be achieved in a short time, so that very high quench rates may be achieved. For additional details, see co-pending application having U.S. Ser. No. 10/211,639, filed the Aug. 2, 2002, the disclosure of which is incorporated herein by reference.

In one aspect of the invention, the raw materials are fed independently to form the molten mixture. In another aspect of the invention, certain raw materials are mixed together, while other raw materials are added independently into the molten mixture. In some embodiments, for example, the raw materials are combined or mixed together prior to melting. The raw materials may be combined in any suitable and known manner to form a substantially homogeneous mixture. These combining techniques include ball milling, mixing, tumbling and the like. The milling media in the ball mill may be metal balls, ceramic balls and the like. The ceramic milling media may be, for example, alumina, zirconia, silica, magnesia and the like. The ball milling may occur dry, in an aqueous environment, or in a solvent-based (e.g., isopropyl alcohol) environment. If the raw material batch contains metal powders, then it is generally desired to use a solvent during milling. This solvent may be any suitable material with the appropriate flash point and ability to disperse the raw materials. The milling time may be from a few minutes to a few days, generally between a few hours to 24 hours. In a wet or solvent based milling system, the liquid medium is removed, typically by drying, so that the resulting mixture is typically homogeneous and substantially devoid of the water and/or solvent. If a solvent based milling system is used, during drying, a solvent recovery system may be employed to recycle the solvent. After drying, the resulting mixture may be in the form of a "dried cake". This cake-like mixture may then be broken up or crushed into the desired particle size prior to melting. Alternatively, for example, spray-drying techniques may be used. The latter typically provides spherical particulates of a desired oxide mixture. The precursor material may also be prepared by wet chemical methods including precipitation and sol-gel. Such methods will be beneficial if extremely high levels of homogeneity are desired.

Particulate raw materials are typically selected to have particle sizes such that the formation of a homogeneous melt can be achieved rapidly. Typically, raw materials with relatively small average particle sizes and narrow distributions are used for this purpose. In some methods (e.g., flame forming and plasma spraying), particularly desirable particulate raw materials are those having an average particle size in a range from about 5 nm to about 50 micrometers (in some embodiments, in a range from about 10 nm to about 20 micrometers, or even about 15 nm to about 1 micrometer), wherein at least 90 (in some embodiments, 95, or even 100) percent by weight of the particulate is the raw material, although sizes outside of the sizes and ranges may also be useful. Particulate less than about 5 nm in size tends to be difficult to handle (e.g., the flow properties of the feed particles tended to be undesirable as they tend to have poor flow properties). Use of particulate larger than about 50 micrometers in typical flame forming or plasma spraying processes tend to make it more difficult to obtain homogenous melts and glasses and/or the desired composition.

Furthermore, in some cases, for example, when particulate material is fed in to a flame or thermal or plasma spray apparatus to form the melt, it may be desirable for the particulate raw materials to be provided in a range of particle sizes. Although not wanting to be bound by theory, it is believed that this maximizes the packing density and strength of the feed particles. If the raw material powders are too coarse, the feed and resulting melt particles may not have the desired composition or the uniformity. In general, the coarsest raw material particles should be smaller than the desired melt or glass particle sizes. Further, raw material particles that are too coarse, tend to generate thermal and mechanical stresses in the feed particles, for example, during a flame forming or plasma spraying step. The end result in such cases is generally fracturing of the feed particles in to particles in to smaller fragments, loss of compositional uniformity, loss of yield in desired glass particle sizes, or even incomplete melting as the fragments generally change their trajectories in a multitude of directions out of the heat source.

The glasses and ceramics comprising glass can be made, for example, by heating (including in a flame or plasma) the appropriate metal oxide sources to form a melt, (desirably a homogenous melt) and then cooling the melt to provide glass. Some embodiments of glasses can be made, for example, by melting the metal oxide sources in any suitable furnace (e.g., an inductively or resistively heated furnace, a gas-fired furnace, or an electric arc furnace).

The glass is typically obtained by relatively rapidly cooling the molten material (i.e., the melt). The quench rate (i.e., the cooling time) to obtain the glass depends upon many factors, including the chemical composition of the melt, the glass-forming ability of the components, the thermal properties of the melt and the resulting glass, the processing technique(s), the dimensions and mass of the resulting glass, and the cooling technique. In general, relatively higher quench rates are required to form glasses comprising higher amounts of $Al_2O_3$ (i.e., greater than 75 percent by weight $Al_2O_3$), especially in the absence of known glass formers such as $SiO2$, $B_2O_3$, $P_2O_5$, $GeO_2$, $TeO_2$, $As_2O_3$, and $V_2O_5$. Similarly, it is more difficult to cool melts into glasses in larger dimensions, as it is more difficult to remove heat fast enough.

In some embodiments of the invention, the raw materials are heated into a molten state in a particulate form and subsequently cooled into glass particles. Typically, the particles have a particle size greater than 25 micrometers (in some embodiments, greater than 50, 100, 150, or even 200 micrometers).

The quench rates achieved in making glasses made according to the methods of the present invention are believed to be higher than $10^2$, $10^3$, $10^4$, $10^5$ or even $10^{6o}$ C./sec (i.e., a temperature drop of 1000° C. from a molten state in less than 10 seconds, less than a second, less than a tenth of a second, less than a hundredth of a second or even less than a thousandth of a second, respectively). Techniques for cooling the melt include discharging the melt into a cooling media (e.g., high velocity air jets, liquids (e.g., cold water), metal plates (including chilled metal plates), metal rolls (including chilled metal rolls), metal balls (including chilled metal balls), and the like). Other cooling techniques known in the art include roll-chilling. Roll-chilling can. be carried out, for example, by melting the metal oxide sources at a temperature typically 20-200° C. higher than the melting point, and cooling/quenching the melt by spraying it under high pressure (e.g., using a gas such as air, argon, nitrogen or the like) onto a high-speed rotary roll(s). Typically, the rolls are made of metal and are water-cooled. Metal book molds may also be useful for cooling/quenching the melt.

The cooling rate is believed to affect the properties of the quenched glass. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

In one method, glasses and ceramics comprising glass can be made utilizing flame fusion as reported, for example, in U.S. Pat. No. 6,254,981 (Castle). In this method, the metal oxide sources are fed (e.g., in the form of particles, sometimes referred to as "feed particles") directly into a burner (e.g., a methane-air burner, an acetylene-oxygen burner, a hydrogen-oxygen burner, and the like), and then quenched, for example, in water, cooling oil, air, or the like. The size of feed particles fed into the flame generally determines the size of the resulting particles comprising glass.

Some embodiments of glasses can also be obtained by other techniques, such as: laser spin melting with free fall cooling, Taylor wire technique, plasmatron technique, hammer and anvil technique, centrifugal quenching, air gun splat cooling, single roller and twin roller quenching, roller-plate quenching, and pendant drop melt extraction (see, e.g., Rapid Solidification of Ceramics, Brockway et al., Metals And Ceramics Information Center, A Department of Defense Information Analysis Center, Columbus, Ohio, January, 1984). Some embodiments of glasses may also be obtained by other techniques, such as: thermal (including flame or laser or plasma-assisted) pyrolysis of suitable precursors, physical vapor synthesis (PVS) of metal precursors and mechanochemical processing.

Other techniques for forming melts, cooling/quenching melts, and/or otherwise forming glass include vapor phase quenching, plasma spraying, melt-extraction, and gas or centrifugal atomization. Vapor phase quenching can be carried out, for example, by sputtering, wherein the metal alloys or metal oxide sources are formed into a sputtering target(s). The target is fixed at a predetermined position in a sputtering apparatus, and a substrate(s) to be coated is placed at a position opposing the target(s). At typical pressures of $10^{-3}$ torr of oxygen gas and Ar gas, a discharge is generated between the target(s) and substrate(s), and Ar or oxygen ions collide against the target to cause reaction sputtering, thereby depositing a film of composition on the substrate. For additional details regarding plasma spraying, see, for example, co-pending application having U.S. Ser. No. 10/211,640, filed Aug. 2, 2002, the disclosure of which is incorporated herein by reference.

Gas atomization involves heating feed particles to convert them to a melt. A thin stream of such melt is atomized through contact with a disruptive air jet (i.e., the stream is divided into fine droplets). The resulting substantially discrete, generally ellipsoidal glass particles (e.g., beads) are then recovered. Examples of bead sizes include those having a diameter in a range of about 5 micrometers to about 3 mm. Melt-extraction can be carried out, for example, as reported in U.S. Pat. No. 5,605,870 (Strom-Olsen et al.). Containerless glass forming techniques utilizing laser beam heating as reported, for example, in U.S. Pat. No. 6,482,758 (Weber), may also be useful in making the glass.

Typically, glass-ceramics made according to the present invention, and some glasses and ceramics comprising glasses used to make such glass-ceramics, have x, y, and z dimensions each perpendicular to each other, and wherein each of the x, y, and z dimensions is at least 10 micrometers. In some embodiments, the x, y, and z dimensions are at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm, if coalesced. The x, y, and z dimensions of a material are determined either visually or using microscopy, depending on the magnitude of the dimensions. The reported z dimension is, for example, the diameter of a sphere, the thickness of a coating, or the shortest dimension of a prismatic shape.

The addition of certain other metal oxides may alter the properties and/or crystalline structure or microstructure of glass-ceramics made according to the present invention, as well as the processing of the raw materials and intermediates in making the ceramic. For example, oxide additions such as CaO, $Li_2O$, MgO, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease glass formation. Compositions based upon complex eutectics in multi-component systems (quaternary, etc.) may have better glass-forming ability. The viscosity of the liquid melt and viscosity of the glass in its working range may also be affected by the addition of metal oxides other than the particular required oxide(s).

Crystallization of glasses and ceramics comprising the glass to form glass-ceramics may also be affected by the additions of materials. For example, certain metals, metal oxides (e.g., titanates and zirconates), and fluorides may act as nucleation agents resulting in beneficial heterogeneous nucleation of crystals. Also, addition of some oxides may change the nature of metastable phases devitrifying from the glass upon reheating. In another aspect, for glass-ceramics made according to the present invention comprising crystalline $ZrO_2$, it may be desirable to add metal oxides (e.g., $Y_2O_3$, $TiO_2$, $CeO_2$, CaO, and MgO) that are known to stabilize the tetragonal/cubic form of $ZrO_2$.

The particular selection of metal oxide sources and other additives for making glass-ceramics made according to the present invention typically takes into account, for example, the desired composition, the microstructure, the degree of crystallinity, the physical properties (e.g., hardness or toughness), the presence of undesirable impurities, and the desired or required characteristics of the particular process (including equipment and any purification of the raw materials before and/or during fusion and/or solidification) being used to prepare the ceramics.

In some instances, it may be preferred to incorporate limited amounts of metal oxides selected from the group consisting of: $B_2O_3$, $Na_2O$, $P_2O_5$, $SiO_2$, $TeO_2$, $V_2O_5$, and combinations thereof. Sources, including commercial sources, include the oxides themselves, complex oxides, elemental (e.g., Si) powders, ores, carbonates, acetates, nitrates, chlorides, hydroxides, etc. These metal oxides may be added, for example, to modify a physical property of the resulting glass-ceramic and/or improve processing. These metal oxides, when used, are typically added from greater than 0 to 20% by weight collectively (in some embodiments, greater than 0 to 5% by weight collectively, or even greater than 0 to 2% by weight collectively) of the glass-ceramic depending, for example, upon the desired property.

The microstructure or phase composition (glassy/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

If it is desired for all the particles to be amorphous (or glass), and the resulting yield is less than 100%, the amorphous (or glass) particles may be separated from the non-amorphous (or non-glass) particles. Such separation may be done, for example, by any conventional techniques, including separating based upon density or optical clarity.

Using DTA, the material is classified as amorphous if the corresponding DTA trace of the material contains an exothermic crystallization event ($T_x$). If the same trace also contains an endothermic event ($T_g$) at a temperature lower than $T_x$, it is considered to include a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K al radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, XRD can be used qualitatively to determine types of phases. The presence of a broad diffuse intensity peak is taken as an indication of the amorphous nature of a material. The existence of both a broad peak and well-defined peaks is taken as an indication of existence of crystalline matter within a glass matrix.

The initially formed glass or ceramic (including glass prior to crystallization) may be larger in size than that desired. If the glass is in a desired geometric shape and/or size, size reduction is typically not needed. The glass or ceramic can be converted into smaller pieces using crushing and/or comminuting techniques known in the art, including roll crushing, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are not of the desired size may be re-crushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments, 1.25:1 to 3:1, or even 1.5:1 to 2.5:1.

It is also within the scope of the present invention, for example, to directly form articles in desired shapes. For example, desired articles may be formed (including molded) by pouring or forming the melt into a mold. Also see, for example, the forming techniques described in application having U.S. Ser. No. 10/358,772, filed Feb. 5, 2003, the disclosure of which is incorporated herein by reference.

Embodiments of glasses and glass-ceramics made according to the present invention can be obtained without limitations in dimensions. This was found to be possible through a coalescing step performed at a temperature above the glass transition temperature. This coalescing step in essence forms a larger sized body from two or more smaller particles. For instance, a glass undergoes glass transition ($T_g$) before significant crystallization occurs ($T_x$) as evidenced by the existence of an endotherm ($T_g$) at lower temperature than an exotherm ($T_x$). For example, ceramic (including glass prior to crystallization), may also be provided by heating, for example, particles comprising the glass, and/or fibers, etc. above the $T_g$ such that the particles, etc. coalesce to form a shape. The temperature and pressure used for coalescing may depend, for example, upon composition of the glass and the desired density of the resulting material. The temperature should be greater than the glass transition temperature. In certain embodiments, the heating is conducted at at least one temperature in a range of about 850° C. to about 1100° C. (in some embodiments, 900° C. to 1000° C.). Typically, the glass is under pressure (e.g., greater than zero to 1 GPa or more) during coalescence to aid the coalescence of the glass. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressing, hot extrusion, hot forging and the like (e.g., sintering, plasma assisted sintering). For example, particles comprising glass (obtained, for example, by crushing) (including beads and microspheres), fibers, etc. may formed into a larger particle size. Coalescing may also result in a body shaped into a desired form (e.g., a geometric shape). In some embodiments, the shaped body is a rod having an aspect ratio greater than 1:1, or even greater than 2:1. In some embodiments, it is desirable to cool the resulting coalesced body before further heat treatment. After heat treatment if so desired, the coalesced body may be crushed to smaller particle sizes or a desired particle size distribution.

Coalescing of the glass may also be accomplished by a variety of methods, including pressure-less or pressure sintering.

In general, heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment (or a portion thereof) can be conducted continuously, for example, using a rotary kiln, fluidized bed furnaces, or pendulum kiln. In the case of a rotary kiln or a pendulum kiln, the material is typically fed directly into the kiln operating at the elevated temperature. In the case of a fluidized bed furnace, the glass to be heat-treated is typically suspended in a gas (e.g., air, inert, or reducing gasses). The time at the elevated temperature may range from a few seconds (in some embodiments, even less than 5 seconds) to a few minutes to several hours. The temperature typically ranges from the Tx of the glass to 1600° C., more typically from 900° C. to 1600° C., and in some embodiments, from 1200° C. to 1500° C. It is also within the scope of the present invention to perform some of the heat-treatment in multiple steps (e.g., one for nucleation, and another for crystal growth; wherein densification also typically occurs during the crystal growth step). When a multiple step heat-treatment is carried out, it is typically desired to control either or both the nucleation and the crystal growth rates. In general, during most ceramic processing operations, it is desired to obtain maximum densification without significant crystal growth. Although not wanting to be bound by theory, in general, it is believed in the ceramic art that larger crystal sizes lead to reduced mechanical properties while finer average crystallite sizes lead to improved mechanical properties (e.g., higher strength and higher hardness). In particular, it is very desirable to form ceramics with densities of at least 90, 95, 97, 98, 99, or even 100 percent of theoretical density, wherein the average crystal sizes are less than 0.15 micrometer, or even less than 0.1 micrometer.

In some embodiments of the present invention, the glasses or ceramics comprising glass may be annealed prior to heat-treatment. In such cases annealing is typically done at a temperature less than the $T_x$ of the glass for a time from a few second to few hours or even days. Typically, the annealing is done for a period of less than 3 hours, or even less than an hour. Optionally, annealing may also be carried out in atmospheres other than air. Furthermore, different stages (i.e., the nucleation step and the crystal growth step) of the heat-treatment may be carried out under different atmospheres. It is believed that the $T_g$ and $T_x$, as well as the $T_x$-$T_g$ of the glasses may shift depending on the atmospheres used during the heat treatment.

One skilled in the art can determine the appropriate conditions from a Time-Temperature-Transformation (TTT) study of the glass using techniques known in the art. One skilled in the art, after reading the disclosure of the present invention should be able to provide TTT curves for glasses used to make glass-ceramics according to the present invention, determine the appropriate nucleation and/or crystal growth conditions to provide glass-ceramics according to the present invention.

Heat-treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for example, it may be desirable to heat-treat under gas pressure as in, for example, a hot-isostatic press, or in a gas pressure furnace. Although not wanting to be bound by theory, it is believed that atmospheres may affect oxidation states of some of the components of the glasses and glass-ceramics. Such variation in oxidation states can bring about varying coloration of glasses and glass-ceramics. In addition, nucleation and crystallization steps can be affected by atmospheres (e.g., the atmosphere may affect the atomic mobilities of some species of the glasses).

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material. It is within the scope of the present invention to convert (e.g., crush) the resulting article or heat-treated article to provide particles (e.g., abrasive particles made according to the present invention).

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, Glass-Ceramics, P. W. McMillan, Academic Press, Inc., $2^{nd}$ edition, 1979.

As compared to many other types of ceramic processing (e.g., sintering of a calcined material to a dense, sintered ceramic material), there is relatively little shrinkage (typically, less than 30 percent by volume; in some embodiments, less than 20 percent, 10 percent, 5 percent, or even less than 3 percent by volume) during crystallization of the glass to form the glass-ceramic. The actual amount of shrinkage depends, for example, on the composition of the glass, the heat-treatment time, the heat-treatment temperature, the heat-treatment pressure, the density of the glass being crystallized, the relative amount(s) of the crystalline phases formed, and the degree of crystallization. The amount of shrinkage can be measured by conventional techniques known in the art, including by dilatometry, Archimedes method, or measuring the dimensions of the material before and after heat-treatment. In some cases, there may be some evolution of volatile species during heat-treatment.

In some embodiments, the relatively low shrinkage feature may be particularly advantageous. For example, articles may be formed in the glass phase to the desired shapes and dimensions (i.e., in near-net shape), followed by heat treatment to at least partially crystallize the glass. As a result, substantial cost savings associated with the manufacturing and machining of the crystallized material may be realized.

In some embodiments, the glass has an x, y, z direction, each of which has a length of at least 1 cm (in some embodiments, at least 5 cm, or even at least 10 cm), wherein the glass has a volume, wherein the resulting glass-ceramic has an x, y, z direction, each of which has a length of at least 1 cm (in some embodiments, at least 5 cm, or even at least 10 cm), wherein the glass-ceramic has a volume of at least 70 (in some embodiments, at least 75, 80, 85, 90, 95, 96, or even at least 97) percent of the glass volume.

For example, during heat-treatment of some exemplary glasses for making glass-ceramics made according to present invention, formation of phases such as $La_2Zr_2O_7$ and/or cubic/tetragonal $ZrO_2$, in some cases monoclinic $ZrO_2$, may occur at temperatures above about 900° C. Although not wanting to be bound by theory, it is believed that zirconia-related phases are the first phases to nucleate from the glass. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10-15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments, even less than 5 seconds) to several minutes to an hour or more.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, IL) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel containing 125-micrometer diamonds, followed by 5 minutes of polishing with each of 45, 30, 15, 9, 3, and 1-micrometer slurries. The mounted and polished sample is sputtered with a thin layer of gold-palladium and viewed using a scanning electron microscopy (such as Model JSM 840A from JEOL, Peabody, Mass.). A typical back-scattered electron (BSE) micrograph of the microstructure found in the sample is used to determine the average crystallite size as follows. The number of crystallites that intersect per unit length ($N_L$) of a random straight line drawn across the micrograph are counted. The average crystallite size is determined from this number using the following equation.

$$\text{Average Crystallite Size} = \frac{1.5}{N_L M},$$

where $N_L$ is the number of crystallites intersected per unit length and M is the magnification of the micrograph.

In another aspect, glass-ceramics made according to the present invention may comprise at least 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer, less than 0.5 micrometer, less than 0.3 micrometer, or even less than less than 0.15 micrometer.

Examples of crystalline phases which may be present in glass-ceramics made according to the present invention include: alumina (e.g., alpha and transition aluminas), REO (e.g., $La_2O_3$), $Y_2O_3$, MgO, one or more other metal oxides such as BaO, CaO, $Cr_2O_3$, CoO, $Fe_2O_3$, $GeO_2$, $Li_2O$, MnO, NiO, $Na_2O$, $P_2O_5$, $Sc_2O_3$, $SiO_2$, SrO, $TeO_2$, $TiO_2$, $V_2O_5$, ZnO, $HfO_2$, $ZrO_2$ (e.g., cubic $ZrO_2$ and tetragonal $ZrO_2$), as well as "complex metal oxides" (including complex $Al_2O_3$.metal oxide (e.g., complex $Al_2O_3$.REO (e.g., $ReAlO_3$ (e.g., $GdAlO_3$, $LaAlO_3$), $ReAl_{11}O_{18}$ (e.g., $LaAl_{11}O_{18}$), and $Re_3Al_5O_{12}$ (e.g., $Dy_3Al_5O_{12}$)), and complex $Al_2O_3$.$Y_2O_3$ (e.g., $Y_3Al_5O_{12}$)), and complex $ZrO_2$.REO (e.g., $La_2Zr_2O_7$)), complex $ZrO_2$.$Nb_2O_5$, complex $ZrO_2$.$Ta_2O_5$, complex REO.$Nb_2O_5$, complex REO.$Ta_2O_5$, complex $Al_2O_3$.$Nb_2O_5$, complex $Al_2O_3$.$Ta_2O_5$, and combinations thereof. Typically, ceramics according to the present invention are free of eutectic microstructure features.

It is also with in the scope of the present invention to substitute a portion of the aluminum cations in a complex $Al_2O_3$.metal oxide (e.g., complex $Al_2O_3$.REO and/or complex $Al_2O_3.Y_2O_3$ (e.g., yttrium aluminate exhibiting a garnet crystal structure)) with other cations. For example, a portion of the Al cations in a complex $Al_2O_3.Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3.Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Further, for example, a portion of the rare earth cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. The substitution of cations as described above may affect the properties (e.g. hardness, toughness, strength, thermal conductivity, etc.) of the ceramic.

Crystals formed by heat-treating amorphous material to provide embodiments of glass-ceramics made according to the present invention may be, for example, acicular equiaxed, columnar, or flattened splat-like features.

Although the glass or glass-ceramic may be in the form of a bulk material, it is also within the scope of the present invention to provide composites comprising glass and/or glass-ceramic made according to the present invention. Such a composite may comprise, for example, a phase or fibers (continuous or discontinuous) or particles (including whiskers) (e.g., metal oxide particles, boride particles, carbide particles, nitride particles, diamond particles, metallic particles, glass particles, and combinations thereof) dispersed in glass-ceramic made according to the present invention, or a layered-composite structure (e.g., a gradient of glass-ceramic to glass used to make the glass-ceramic and/or layers of different compositions of glass-ceramics).

Certain glasses used to make the glass-ceramics may have, for example, a $T_g$ in a range of about 750° C. to about 950° C., or even higher.

The average hardness of the glass-ceramics made according to the present invention can be determined as follows. Sections of the material are mounted in mounting resin (obtained under the trade designation "TRANSOPTIC POWDER" from Buehler, Lake Bluff, IL) typically in a cylinder of resin about 2.5 cm in diameter and about 1.9 cm high. The mounted section is prepared using conventional polishing techniques using a polisher (such as that obtained from Buehler, Lake Bluff, IL under the trade designation "ECOMET 3"). The sample is polished for about 3 minutes with a diamond wheel containing 125-micrometer diamonds, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991). The average hardness is an average of 10 measurements.

Certain glass-ceramics made according to the present invention typically have an average hardness of at least 12 GPa, 13 GPa, 14 GPa, 15 GPa, 16 GPa, 17 GPa, 18 GPa, or even at least 19 GPa. Abrasive particles made according to the present invention have an average hardness of at least 15 GPa, in some embodiments, at least 16 GPa, at least 17 GPa, 18 GPa, or even at least 19 GPa.

In some embodiments glass-ceramics and of glasses used to make according to the present invention, if the glass-ceramic or glass comprises $Al_2O_3$ (in some embodiments, 35.73 percent by weight $Al_2O_3$; in some embodiments, about 35 or 36 percent by weight $Al_2O_3$; in some embodiments, in a range from 35 to 36, 34 to 36, or 34 to 37 percent by weight $Al_2O_3$), $La_2O_3$ (in some embodiments, REO) (in some embodiments, 42.17 percent by weight $La_2O_3$ (in some embodiments, REO); in some embodiments, about 42 percent by weight $La_2O_3$ (in some embodiments, REO); in some embodiments, in a range from 42 to 43 or 41 to 43) percent by weight $La_2O_3$ (in some embodiments, REO), and $ZrO_2$ (in some embodiments, $ZrO_2$ and/or (including collectively) $HfO_2$) (in some embodiments, 17.1 percent by weight $ZrO_2$ (in some embodiments, at least one of $ZrO_2$ or $HfO_2$); in some embodiments, about 17 percent by weight $ZrO_2$ (in some embodiments, at least one of $ZrO_2$ or $HfO_2$); in some embodiments, in a range from 17 to 18 or 16 to 18) percent by weight $ZrO_2$ (in some embodiments, at least one of $ZrO_2$ or $HfO_2$) are present, the glass or glass-ceramic comprises either less than or greater than 5 (in some embodiments, not about 5, less than 5, or greater than 5; in some embodiments, not greater than 4, 3, 2, or 1 or at least 6, 7, 8, 9, 10, 15, 20, 25, 30, 35, 40, 45, 50, 55, 60, 65, 70, 75, or even at least 80) percent by weight of the at least one of $Nb_2O_5$ or $Ta_2O_5$, based on the total weight of the glass-ceramic or glass, respectively.

Typically, and desirably, the (true) density, sometimes referred to as specific gravity, of glass-ceramics made according to the present invention, and glasses used to make such glass-ceramics, is typically at least 70% of theoretical density. More desirably, the (true) density of glass-ceramics made according to the present invention, and glasses used to make such glass-ceramics is at least 75%, 80%, 85%, 90%, 95%, 96%, 97%, 98%, 99%, 99.5%, or even 100% of theoretical density. Abrasive particles made according to the present invention have densities of at least 85%, 90%, 92%, 95%, 96%, 97%, 98%, 99%, 99.5%, or even 100% of theoretical density.

Articles can be made using glass-ceramics made according to the present invention, for example, as a filler, reinforcement material, and/or matrix material. For example, glass-ceramic made according to the present invention can be in the form of particles and/or fibers suitable for use as reinforcing materials in composites (e.g., ceramic, metal, or polymeric (thermosetting or thermoplastic)). The particles and/or fibers may, for example, increase the modulus, heat resistance, wear resistance, and/or strength of the matrix material. Although the size, shape, and amount of the particles and/or fibers used to make a composite may depend, for example, on the particular matrix material and use of the composite, the size of the reinforcing particles typically range from about 0.1 to 1500 micrometers, more typically 1 to 500 micrometers, and desirably between 2 to 100 micrometers. The amount of particles for polymeric applications is typically about 0.5 percent to about 75 percent by weight, more typically about 1 to about 50 percent by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., reinforcing particles made according to the present invention dispersed in a polymer) include protective coatings, for example, for concrete, furniture, floors, roadways, wood, wood-like materials, ceramics, and the like, as well as, anti-skid coatings and injection molded plastic parts and components.

Further, for example, glass-ceramic made according to the present invention can be used as a matrix material. For example, glass-ceramics made according to the present invention can be used as a binder for ceramic materials and the like such as diamond, cubic-BN, $Al_2O_3$, $ZrO_2$, $Si_3N_4$, and SiC. Examples of useful articles comprising such materials include composite substrate coatings, reinforcing material (e.g., particles), cutting tool inserts abrasive agglomerates, and bonded abrasive articles such as vitrified wheels. The glass-ceramics made according to the present invention can be used as binders, for example, to increase the modulus, heat resistance, wear resistance, and/or strength of the composite article.

Abrasive particles made according to the present invention generally comprise crystalline ceramic (e.g., at least 75, 80, 85, 90, 91, 92, 93, 94, 95, 96, 97, 98, 99, 99.5, or even 100 percent by volume crystalline ceramic). In another aspect, the present invention provides a plurality of particles having a particle size distribution ranging from fine to coarse, wherein at least a portion of the plurality of particles are abrasive particles made according to the present invention. In another aspect, embodiments of abrasive particles made according to the present invention generally comprise (e.g., at least 75, 80, 85, 90, 91, 92, 93, 94, 95, 96, 97, 98, 99, 99.5, or even 100 percent by volume) glass-ceramic made according to the present invention.

Abrasive particles made according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles made according to the present invention may be used in a wide range of particle sizes, typically ranging in size from about 0.1 to about 5000 micrometers, about 1 to about 2000 micrometers, about 5 to about 1500 micrometers, or even, in some embodiments, from about 100 to about 1500 micrometers.

In a given particle size distribution, there will be a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form glass. This recycling may occur after the crushing step, where the particles are in large chunks or smaller pieces (sometimes referred to as "fines") that have not been screened to a particular distribution. When crushed, glass tends to provide sharper particles than crushing significantly crystallized glass-ceramics.

In another aspect, the present invention provides agglomerate abrasive grains each comprising a plurality of abrasive particles made according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) made according to the present invention. Methods of making such abrasive articles and using abrasive articles are well known to those skilled in the art. Furthermore, abrasive particles made according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. Suitable binders include inorganic or organic binders (including thermally curable resins and radiation curable resins). The abrasive particles can be present in one layer or in two layers of the coated abrasive article.

An example of a coated abrasive article is depicted in FIG. 1. Referring to FIG. 1, coated abrasive article 1 has a backing (substrate) 2 and abrasive layer 3. Abrasive layer 3 includes abrasive particles made according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3-50% by volume bond material, about 30-90% by volume abrasive particles (or abrasive particle blends), up to 50% by volume additives (including grinding aids), and up to 70% by volume pores, based on the total volume of the bonded abrasive article.

Figure 2:
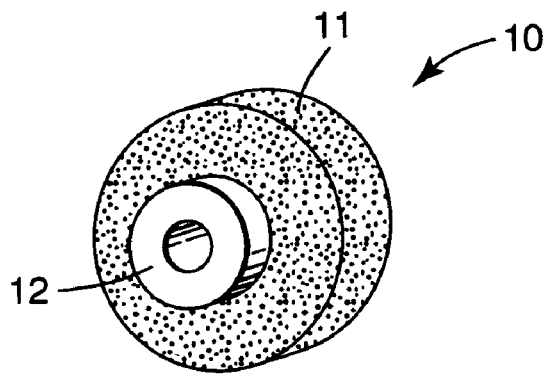
FIG. 2 is a perspective view of a bonded abrasive article including abrasive particles made according to the present invention.

An exemplary grinding wheel is shown in FIG. 2. Referring to FIG. 2, grinding wheel 10 is depicted, which includes abrasive particles made according to the present invention 11, molded in a wheel and mounted on hub 12.

Figure 3:
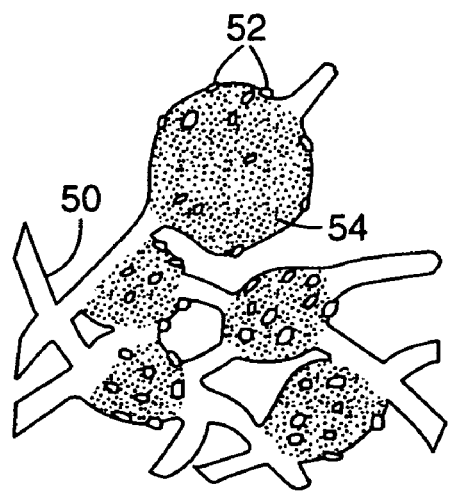
FIG. 3 is an enlarged schematic view of a portion of a nonwoven abrasive article including abrasive particles made according to the present invention.

Nonwoven abrasive articles typically include an open porous lofty polymer filament structure having abrasive particles made according to the present invention distributed throughout the structure and adherently bonded therein by an organic binder. Examples of filaments include polyester fibers, polyamide fibers, and polyaramid fibers. An exemplary nonwoven abrasive article is shown in FIG. 3. Referring to FIG. 3, a schematic depiction, enlarged about 100x, of a typical nonwoven abrasive article is shown, comprises fibrous mat 50 as a substrate, onto which abrasive particles made according to the present invention 52 are adhered by binder 54.

Useful abrasive brushes include those having a plurality of bristles unitary with a backing (see, e.g., U.S. Pat. Nos. 5,427,595 (Pihl et al.), 5,443,906 (Pihl et al.), 5,679,067 (Johnson et al.), and 5,903,951 (Ionta et al.)). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α, β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may be thermally cured, radiation cured or combinations thereof. Additional details on binder chemistry may be found in U.S. Pat. Nos. 4,588,419 (Caul et al.), 4,751,138 (Tumey et al.), and 5,436,063 (Follett et al.).

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles made according to the present invention may be in the shape of a wheel (including cut off wheels), honing stone, mounted pointed or other conventional bonded abrasive shape. In some embodiments, a vitrified bonded abrasive article made according to the present invention is in the form of a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50-300 $g/m^2$ (desirably, about 80-160 g/m$^2$). In vitrified bonded abrasive articles grinding aid is typically impregnated into the pores of the article.

The abrasive articles can contain 100% abrasive particles made according to the present invention, or blends of such abrasive particles with other abrasive particles and/or diluent particles. However, at least about 2% by weight, desirably at least about 5% by weight, and more desirably about 30-100% by weight, of the abrasive particles in the abrasive articles should be abrasive particles made according to the present invention. In some instances, the abrasive particles according to the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol-gel abrasive particles include those described in U.S. Pat. Nos. 4,314,827 (Leitheiser et al.), 4,518,397 (Leitheiser et al.), 4,623,364 (Cottringer et al.), 4,744,802 (Schwabel), 4,770,671 (Monroe et al.), 4,881,951 (Wood et al.), 5,011,508 (Wald et al.), 5,090,968 (Pellow), 5,139,978 (Wood), 5,201,916 (Berg et al.), 5,227,104 (Bauer), 5,366,523 (Rowenhorst et al.), 5,429,647 (Larmie), 5,498,269 (Larmie), and 5,551,963 (Larmie). Additional details concerning sintered alumina abrasive particles made by using alumina powders as a raw material source can also be found, for example, in U.S. Pat. Nos. 5,259,147 (Falz), 5,593,467 (Monroe), and 5,665,127 (Moltgen). Additional details concerning fused abrasive particles, can be found, for example, in U.S. Pat. Nos. 1,161,620 (Coulter), 1,192,709 (Tone), 1,247,337 (Saunders et al.), 1,268,533 (Allen), and 2,424,645 (Baumann et al.), 3,891,408 (Rowse et al.), 3,781,172 (Pett et al.), 3,893,826 (Quinan et al.), 4,126,429 (Watson), 4,457,767 (Poon et al.), 5,023,212 (Dubots et. Al.), 5,143,522 (Gibson et al.), 5,336,280 (Dubots et. Al.), 6,451,077 (Rosenflanz), 6,454,822 (Rosenflanz), 6,458,731 (Rosenflanz), 6,582,488 (Rosenflanz), 6,583,080 (Rosenflanz), 6,589,305 (Rosenflanz), 6,592,640 (Rosenflanz et al.), 6,596,041 (Rosenflanz), 6,607,570 (Rosenflanz et al.), 6,666,750 (Rosenflanz), 6,669,749 (Rosenflanz et al.), and 6,706,083 (Rosenflanz) and applications having U.S. Ser. Nos. 09/495,978, 09/496,422, 09/496,638, and 09/496,713, each filed on Feb. 2, 2000; and 09/618,876, filed on Jul. 19, 2000. Additional details concerning ceramic abrasive particles, can be found, for example, in applications having U.S. Ser. Nos. 09/922,526, 09/922,527, 09/922,528, and 09/922,530, each filed Aug. 2, 2001, now abandoned, 10/211,597, 10/211,638, 10/211,629, 10/211,598, 10/211,630, 10/211,639, 10/211,034, 10/211,044, 10/211,628, 10/211,491, 10/211,640, and 10/211,684, each filed Aug. 2, 2002; and 10/358,772, 10/358,765, 10/358,910, 10/358,855, and 10/358,708, each filed Feb. 5, 2003. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles made according to the present invention, with the smaller sized particles being another abrasive particle type. Conversely, for example, the smaller sized abrasive particles may be abrasive particles made according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles made according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. Nos. 4,311,489 (Kressner), 4,652,275 (Bloecher et al.), 4,799,939 (Bloecher et al.), 5,549,962 (Holmes et al.), and 5,975,988 (Christianson), and applications having U.S. Ser. Nos. 09/688,444 and 09/688,484, each filed Oct. 16, 2000, 09/688,444, 09/688,484, and 09/688,486, each filed Oct. 16, 2000, and 09/971,899, 09/972,315, and 09/972,316, each filed Oct. 5, 2001.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles made according to the present invention, and the second (outermost) layer comprises abrasive particles made according to the present invention. Likewise in a bonded abrasive, there may be two distinct sections of the grinding wheel. The outermost section may comprise abrasive particles made according to the present invention, whereas the innermost section does not. Alternatively, abrasive particles made according to the present invention may be uniformly distributed throughout the bonded abrasive article.

Further details regarding coated abrasive articles can be found, for example, in U.S. Pat. Nos. 4,734,104 (Broberg), 4,737,163 (Larkey), 5,203,884 (Buchanan et al.), 5,152,917 (Pieper et al.), 5,378,251 (Culler et al.), 5,417,726 (Stout et al.), 5,436,063 (Follett et al.), 5,496,386 (Broberg et al.), 5,609,706 (Benedict et al.), 5,520,711 (Helmin), 5,954,844 (Law et al.), 5,961,674 (Gagliardi et al.), and 5,975,988 (Christianson). Further details regarding bonded abrasive articles can be found, for example, in U.S. Pat. Nos. 4,543,107 (Rue), 4,741,743 (Narayanan et al.), 4,800,685 (Haynes et al.), 4,898,597 (Hay et al.), 4,997,461 (Markhoff-Matheny et al.), 5,037,453 (Narayanan et al.), 5,110,332 (Narayanan et al.), and 5,863,308 (Qi et al.). Further details regarding vitreous bonded abrasives can be found, for example, in U.S. Pat. Nos. 4,543,107 (Rue), 4,898,597 (Hay et al.), 4,997,461 (Markhoff-Matheny et al.), 5,094,672 (Giles Jr. et al.), 5,118,326 (Sheldon et al.), 5,131,926 (Sheldon et al.), 5,203,886 (Sheldon et al.), 5,282,875 (Wood et al.), 5,738,696 (Wu et al.), and 5,863,308 (Qi). Further details regarding nonwoven abrasive articles can be found, for example, in U.S. Pat. No. 2,958,593 (Hoover et al.).

The present invention provides a method of abrading a surface, the method comprising contacting at least one abrasive particle made according to the present invention, with a surface of a workpiece; and moving at least of one the abrasive particle or the contacted surface to abrade at least a portion of said surface with the abrasive particle. Methods for abrading with abrasive particles made according to the present invention range from snagging (i.e., high pressure high stock removal) to polishing (e.g., polishing medical implants with coated abrasive belts), wherein the latter is typically done with finer grades (e.g., ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles made according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles made according to the present invention may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Advantages and embodiments of this invention are further illustrated by the following non-limiting examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

Comparative Example A

A polyethylene bottle was charged with 112.8 grams of alumina powder (obtained under the trade designation "APA-0.5"from Condea Vista, Tucson, Ariz.), 133.17 grams of lanthanum oxide powder (obtained from Molycorp, Inc.), 54 grams of zirconium oxide powder (with a nominal composition of 94.4 wt % $ZrO_2$ (+$HfO_2$); 5.6 wt. % $Y_2O_3$ obtained under the trade designation "HSY-3" from Zirconia Sales, Inc. of Marietta, Ga.) and 150.6 grams of distilled water. About 450 grams of alumina milling media (10 mm diameter; 99.9% alumina; obtained from Union Process, Akron, Ohio) were added to the bottle, and the mixture was milled for 4 hours to thoroughly mix the ingredients. After the milling, the milling media were removed and the slurry was poured onto a glass ("PYREX") pan where it was dried using a heat-gun. After grinding with a mortar and pestle, some of the multiphase particles were fed into a hydrogen/oxygen torch flame. The hydrogen torch used to melt the multiphase particles, thereby generating a melted glass bead, was a Bethlehem bench burner, delivering hydrogen and oxygen at the following rates. For the inner ring, the hydrogen flow rate was 8 standard liters per minute (SLPM), the oxygen flow rate was 3 SLPM. For the outer ring, the hydrogen flow rate was 23 standard liters per minute (SLPM), the oxygen flow rate was 9.8 SLPM. The dried and sized particles were fed directly into the hydrogen torch flame, where they were melted and transported to an inclined stainless steel surface (about 20 inches wide with the slope angle of 45 degrees) with cold water running over (about 8 l/min.).

Comparative Example B

Comparative Example B beads were prepared as described in Comparative Example A, except the polyethylene bottle was charged with 26.8 grams of the alumina powder ("APA-0.5"), 14.05 grams of yttrium oxide ($Y_2O_3$) powder, (obtained from Aldrich Chemical Company, Inc., Milwaukee, Wis.), 9.2 grams of the zirconium oxide powder ("HSY-3") and 145 grams of distilled water.

Examples 1 and 2

Example 1 and 2 beads were prepared as described for Comparative Example A, except the raw materials used, and the amounts of raw materials used, are listed in Table 1, below, and milling of raw materials was carried out in 145 grams of distilled water with 200 grams of zirconia media (obtained from Tosoh Ceramics, Division of Bound Brook, N.J., under "YTZ" designation) at 120 rpm for 24 hours. The sources of the raw materials used are listed in Table 26, below.

TABLE 1

| Example | Powder Batch Amounts, g | Weight Percent of components |
|---|---|---|
| 1 | $Al_2O_3$: 17.87<br>$La_2O_3$: 21.08<br>$ZrO_2$: 8.55<br>$Nb_2O_5$: 2.5 | $Al_2O_3$: 35.73<br>$La_2O_3$: 42.17<br>$ZrO_2$: 17.1<br>$Nb_2O_5$: 5 |
| 2 | $Al_2O_3$: 17.87<br>$La_2O_3$: 21.08<br>$ZrO_2$: 8.55<br>$Ta_2O_5$: 2.5 | $Al_2O_3$: 35.73<br>$La_2O_3$: 42.17<br>$ZrO_2$: 17.1<br>$Ta_2O_5$: 5 |

TABLE 2

| Raw Material | Source |
|---|---|
| Alumina ($Al_2O_3$) powder | Obtained from Condea Vista, Tucson, AZ under the trade designation "APA-0.5" |
| Lanthanum oxide ($La_2O_3$) powder | Obtained from Molycorp Inc. |
| Niobium oxide ($Nb_2O_5$) powder | Obtained from Aldrich Chemical, Milwaukee, WI |
| Tantalum oxide ($Ta_2O_5$) powder | Obtained from Aldrich Chemical |
| Yttria-stabilized zirconium oxide (Y-PSZ) powder | Obtained from Zirconia Sales, Inc. of Marietta, GA under the trade designation "HSY-3" |

Comparative Examples C-I

Comparative Example C-I beads were prepared as described in Comparative Example A, except the raw materials used, and the amounts of raw materials used, are listed in Table 3, below, and milling of raw materials was carried out in 145 grams of distilled water with 200 grams of zirconia media (obtained from Tosoh Ceramics, Division of Bound Brook, N.J., under "YTZ" designation) at 120 rpm for 24 hours. The sources of the raw materials used are listed in Table 4, below.

TABLE 3

| Example | Powder Batch Amounts, g | Weight Percent of components |
|---|---|---|
| Comp. C | Al$_2$O$_3$: 17.87<br>La$_2$O$_3$: 21.08<br>ZrO$_2$: 8.55<br>SrO: 2.5 | Al$_2$O$_3$: 35.73<br>La$_2$O$_3$: 42.17<br>ZrO$_2$: 17.1<br>SrO: 5 |
| Comp. D | Al$_2$O$_3$: 17.87<br>La$_2$O$_3$: 21.08<br>ZrO$_2$: 8.55<br>Mn$_2$O$_3$: 2.5 | Al$_2$O$_3$: 35.73<br>La$_2$O$_3$: 42.17<br>ZrO$_2$: 17.1<br>Mn$_2$O$_3$: 5 |
| Comp. E | Al$_2$O$_3$: 18.25<br>La$_2$O$_3$: 21.52<br>ZrO$_2$: 8.73<br>Fe$_2$O$_3$: 1.5 | Al$_2$O$_3$: 36.5<br>La$_2$O$_3$: 43.04<br>ZrO$_2$: 17.46<br>Fe$_2$O$_3$: 3 |
| Comp. F | Al$_2$O$_3$: 18.25<br>La$_2$O$_3$: 21.52<br>ZrO$_2$: 8.73<br>Cr$_2$O$_3$: 1.5 | Al$_2$O$_3$: 36.5<br>La$_2$O$_3$: 43.04<br>ZrO$_2$: 17.46<br>Cr$_2$O$_3$: 3 |
| Comp. G | Al$_2$O$_3$: 18.25<br>La$_2$O$_3$: 21.52<br>ZrO$_2$: 8.73<br>TiO$_2$: 1.5 | Al$_2$O$_3$: 36.5<br>La$_2$O$_3$: 43.04<br>ZrO$_2$: 17.46<br>TiO$_2$: 3 |
| Comp. H | Al$_2$O$_3$: 25.45<br>Y$_2$O$_3$: 13.35<br>ZrO$_2$: 8.7<br>Ta$_2$O$_5$: 2.5 | Al$_2$O$_3$: 50.9<br>Y$_2$O$_3$: 26.7<br>ZrO$_2$: 17.4<br>Ta$_2$O$_5$: 5 |
| Comp. I | Al$_2$O$_3$: 25.43<br>Y$_2$O$_3$: 13.35<br>ZrO$_2$: 8.7<br>Nb$_2$O$_5$: 2.5 | Al$_2$O$_3$: 50.9<br>Y$_2$O$_3$: 26.7<br>ZrO$_2$: 17.4<br>Nb$_2$O$_5$: 5 |

TABLE 4

| Raw Material | Source |
|---|---|
| Alumina (Al$_2$O$_3$) powder | Obtained from Condea Vista, Tucson, AZ under the trade designation "APA-0.5" |
| Chromium oxide (Cr$_2$O$_3$) powder | Obtained from Aldrich Chemical Company |
| Iron oxide (Fe$_2$O$_3$) powder | Obtained from Aldrich Chemical Company |
| Lanthanum oxide (La$_2$O$_3$) powder | Obtained from Molycorp Inc. and calcined at 700° C. for 6 hours prior to batch mixing |
| Manganese oxide (Mn$_2$O$_3$) powder | Obtained from Aldrich Chemical Company |
| Niobium oxide (Nb$_2$O$_5$) powder | Obtained from Aldrich Chemical Company |
| Strontium oxide (SrO) powder | Obtained from Aldrich Chemical Company |
| Tantalum oxide (Ta$_2$O$_5$) powder | Obtained from Aldrich Chemical Company |
| Titanium dioxide (TiO$_2$) powder | Obtained from Kemira Inc., Savannah, GA |
| Yttria (Y$_2$O$_3$) powder | Obtained from Obtained from H. C. Stark Newton, MA |
| Yttria-stabilized zirconium oxide (Y-PSZ) powder | Obtained from Zirconia Sales, Inc. of Marietta, GA under the trade designation "HSY-3" |

Heat-treatment

Comparative Examples A-I and Examples 1 and 2 beads in −75+38 mesh size fraction (i.e., the fraction collected between 75-micrometer opening size and 38-micrometer opening size screens) were heat-treated in air at temperatures ranging from 1000° C. to 1300° C. for 60 minutes. Heat-treating was performed in an electrically heated furnace (obtained under the trade designation "Model KKSK-666-3100" from Keith Furnaces of Pico Rivera, Calif.).

Powder x-ray diffraction (using an x-ray diffractometer (obtained under the trade designation "PHILLIPS XRG 3100" from PHILLIPS, Mahwah, N.J.) with copper K (1 radiation of 1.54050 Angstrom) was used to qualitatively measure phases present in the heat-treated materials. The phases detected, and their relative intensities in x-rayed materials are reported in Table 5, below.

TABLE 5

| Example | Temperature, ° C. | LaAlO$_3$ | YAlO$_3$ | Y$_3$Al$_5$O$_{12}$ | LaAl$_{11}$O$_{18}$ | La$_2$Zr$_2$O$_7$ | ZrO$_2$ (C, T) | (Zr, M)O$_2$ FCC | α-Al$_2$O$_3$ | Transit. Al$_2$O$_3$ |
|---|---|---|---|---|---|---|---|---|---|---|
| Comp. A | 1000 | 90 | ND | ND | ND | 100 | ND | ND | ND | 5 |
|  | 1100 | 85 | ND | ND | ND | 100 | 73 | ND | ND | ND |
|  | 1300 | 100 | ND | ND | 6 | ND | 27 | ND | 4 | ND |
| Comp. B | 1000 | ND | 32 | ND | ND | ND | 100 | ND | ND | 15 |
|  | 1100 | ND | 38 | ND | ND | ND | 100 | ND | ND | 10 |
|  | 1300 | ND | ND | 100 | ND | ND | 32 | ND | 12 | 2 |
| Comp. C | 1000 | 55 | ND | ND | ND | ND | ND | 100 | 4 | 3 |
|  | 1100 | 100 | ND | ND | ND | ND | 22 | 16 | ND | 3 |
|  | 1300 | 100 | ND | ND | 8 | ND | 32 | ND | ND | 7 |
| Comp. D | 1000 | 100 | ND | ND | ND | ND | ND | 67 | ND | 5 |
|  | 1100 | 100 | ND | ND | 11 | ND | 30 | ND | ND | 9 |
|  | 1300 | 100 | ND | ND | 10 | ND | 27 | ND | ND | 7 |
| Comp. E | 1000 | 83 | ND | ND | ND | ND | ND | 100 | ND | 3 |
|  | 1100 | 100 | ND | ND | ND | ND | 30 | ND | ND | 3 |
|  | 1300 | 100 | ND | ND | 5 | ND | 26 | ND | ND | 7 |
| Comp. F | 1000 | 72 | ND | ND | ND | ND | 5 | 100 | 3 | 8 |
|  | 1100 | 95 | ND | ND | ND | ND | 30 | ND | ND | 9 |
|  | 1300 | 100 | ND | ND | 6 | ND | 23 | ND | ND | 9 |
| Comp. G | 1000 | 100* | ND | ND | ND | ND | ND | 43 | ND | 3 |
|  | 1100 | 100* | ND | ND | ND | ND | 8 | 26 | ND | 4 |
|  | 1300 | 100 | ND | ND | ND | ND | 31 | ND | ND | 7 |

TABLE 5-continued

| Example | Temperature, °C. | LaAlO$_3$ | YAlO$_3$ | Y$_3$Al$_5$O$_{12}$ | LaAl$_{11}$O$_{18}$ | La$_2$Zr$_2$O$_7$ | ZrO$_2$ (C, T) | (Zr, M)O$_2$ FCC | α-Al$_2$O$_3$ | Transit. Al$_2$O$_3$ |
|---|---|---|---|---|---|---|---|---|---|---|
| Comp. H | 1000 | ND | 10 | ND | ND | ND | 100 | ND | ND | 10 |
|  | 1100 | ND | 7 | ND | ND | ND | 100 | ND | ND | 7 |
|  | 1300 | ND | ND | 100 | ND | ND | 29 | ND | 8 | 5 |
| Comp. I | 1000 | ND | 4 | ND | ND | ND | 100 | ND | ND | 8 |
|  | 1100 | ND | 5 | ND | ND | ND | 100 | ND | ND | 6 |
|  | 1300 | ND | ND | 100 | ND | ND | 31 | ND | 3 | 4 |
| 1 | 1000 | 4 | ND | ND | ND | ND | ND | 100 | 2 | 4 |
|  | 1100 | 39 | ND | ND | ND | ND | 2 | 100 | ND | 6 |
|  | 1300 | 100 | ND | ND | ND | ND | 29 | 8 | ND | 6 |
| 2 | 1000 | 7 | ND | ND | ND | ND | ND | 100 | 2 | 4 |
|  | 1100 | 47 | ND | ND | ND | ND | 1 | 100 | ND | 5 |
|  | 1300 | 100 | ND | ND | ND | ND | 30 | 7 | ND | 5 |

*Primitive Cubic Crystal Structure
ND = Not Detected

One gram of each of the Comparative Example A and Examples 1 and 2 heat-treated materials were mixed with an internal standard (Al$_2$O$_3$ in the form of corundum, 1.0 micrometer in crystallite size) in a 1:1 ratio by mass. The 1:1 mixture was homogenized for 10 minutes in an agate mortar under ethanol and allowed to dry. The mixture was then retrieved from the agate mortar and slurried onto aluminum sample holders with glass inserts using methyl ethyl ketone (MEK).

A total of nine survey scans were obtained from each sample/standard mixture using a vertical diffractometer ("PHILLIPS XRG 3100"), copper K$_α$ radiation, and proportional detector registry of the scattered radiation. The diffractometer was fitted with variable incident beam slits, fixed diffracted beam slits, and a graphite diffracted beam monochromator. The survey scans were conducted from 20 to 52 degrees (2θ) using a 0.04 degree step size and 6 second dwell time. X-ray generator settings of 45 kV and 35 mA were employed.

Peak areas for the phases present in the samples and peak areas from the corundum internal standard were determined by profile fitting the observed data. A Pearson VII peak shape model and linear background were employed for profile fitting. The peaks used for the phases present and the corundum internal standard are listed in Table 6, below:

TABLE 6

| Phase/Standard | Peaks Used (reported in degrees 2θ) |
|---|---|
| LaAlO$_3$ | 23.4, 33.4 |
| LaAl$_{11}$O$_{18}$ | 32.2, 34.0 |

TABLE 6-continued

| Phase/Standard | Peaks Used (reported in degrees 2θ) |
|---|---|
| La$_2$Zr$_2$O$_7$ | 33.7, 48.4 |
| ZrO$_2$ (C, T) | 29.2, 48.4 |
| (Zr, M)O$_2$ | 29.0, 33.5 |
| transitional Al$_2$O$_3$ | 46.2 |
| Al$_2$O$_3$ (corundum) as internal standard | 37.8, 43.4 |

The I$_p$/I$_c$ ratio for each phase present in the submitted samples was determined from the following equation:

Calculated Ratio=I$_p$/I$_c$ * (m$_{sample}$/m$_{standard}$), wherein

I$_p$=sum of individual phase peak areas,
I$_c$=sum of individual corundum peak areas,
m$_{sample}$=amount of sample used (in grams), and
m$_{standard}$=amount of standard used (in grams).

The I$_p$/I$_c$ ratios for each of the phases detected are listed in Table 7, below.

TABLE 7

| Example | Temp., °C. | LaAlO$_3$ | LaAl$_{11}$O$_{18}$ | La$_2$Zr$_2$O$_7$ | ZrO$_2$ (C, T) | (Zr, M)O$_2$ FCC | Transitional Al$_2$O$_3$ |
|---|---|---|---|---|---|---|---|
| Comp. A | 1000 | 0.22 | ND | 0.48 | ND | ND | 0.01 |
|  | 1100 | 0.16 | ND | 0.29 | 0.23 | ND | 0.02 |
|  | 1300 | 0.58 | ND | ND | 0.22 | ND | 0.01 |
| 1 | 1000 | 0.24 | ND | ND | ND | 0.70 | 0.01 |
|  | 1100 | 0.39 | ND | ND | 0.15 | 0.28 | 0.03 |
|  | 1300 | 0.47 | ND | ND | 0.43 | ND | 0.02 |
| 2 | 1000 | 0.30 | ND | ND | ND | 0.77 | 0.03 |
|  | 1100 | 0.46 | ND | ND | 0.85 | 0.73 | 0.02 |
|  | 1300 | 0.56 | ND | ND | 0.18 | 0.52 | 0.02 |

ND = Not Detected

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making a glass-ceramic, the method comprising heat-treating glass to convert at least a portion of the glass to crystalline ceramic and provide glass-ceramic, the glass comprising at least 50 percent by weight Al$_2$O$_3$, based on the total weight of the glass, REO, ZrO$_2$, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$.

2. A method for making a glass-ceramic, the method comprising heat-treating glass to convert at least a portion of the glass to crystalline ceramic and provide glass-ceramic, the glass comprising at least 40 percent by weight $Al_2O_3$, based on the total weight of the glass, REO, at least 20 percent by weight $ZrO_2$, based on the total weight of the glass, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the sample glass free of $Nb_2O_5$ and $Ta_2O$.

3. A method for making a glass-ceramic, the method comprising heat-treating glass to convert at least a portion of the glass to crystalline ceramic and provide glass-ceramic, the glass comprising at least 50 percent by weight $Al_2O_3$, at least 30 percent by weight REO, and at least 10 percent by weight $ZrO_2$, based on the total weight of the glass, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$.

4. A method for making abrasive particles, the method comprising heat-treating glass particles to convert at least a portion of the glass to crystalline ceramic to provide glass-ceramic abrasive particles, the glass comprising at least 50 percent by weight $Al_2O_3$, based on the total weight of the glass, REO, $ZrO_2$, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$.

5. A method for making abrasive particles, the method comprising heat-treating glass particles to convert at least a portion of the glass to crystalline ceramic to provide glass-ceramic abrasive particles, the glass comprising at least 35 percent by weight $Al_2O_3$, based on the total weight of the glass, REO, at least 20 percent by weight $ZrO_2$, based on the total weight of the glass, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$.

6. A method for making abrasive particles, the method comprising heat-treating glass particles to convert at least a portion of the glass to crystalline ceramic to provide glass-ceramic abrasive particles, the glass comprising at least 50 percent by weight $Al_2O_3$, at least 30 percent by weight REO, at least 10 percent by weight $ZrO_2$, based on the total weight of the glass, and at least one of $Nb_2O_5$ or $Ta_2O_5$, wherein the glass contains not more than 10 percent by weight collectively $AS_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$.

7. The method according to claim 1, wherein the at least one of $Nb_2O_5$ or $Ta_2O_5$ is present in an amount sufficient to increase the rate of crystalline $ZrO_2$ formation from the glass by at least a factor of 1.5 as compared to the comparative glass-ceramic.

8. The method according to claim 1, wherein the at least of $Nb_2O_5$ or $Ta_2O_5$ is present in an amount sufficient to increase the rate of crystalline $ZrO_2$ formation from the glass by at least a factor of 2 as compared to the comparative glass-ceramic.

9. The method according to claim 1, wherein the at least one of $Nb_2O_5$ or $Ta_2O_5$ is present in an amount sufficient to increase the rate of crystalline $ZrO_2$ formation from the glass by at least a factor of 3 as compared to the comparative glass-ceramic.

10. The method according to claim 1, wherein the REO is at least one of $Gd_2O_3$, $La_2O_3$, or $Nd_2O_3$.

11. A method of making abrasive particles, the method comprising:
heat-treating glass to convert at least a portion of the glass to crystalline ceramic and provide glass-ceramic, the glass comprising at least 50 percent by weight $Al_2O_3$, based on the total weight of the glass, REO, $ZrO_2$, and at least one of $Nb_2O_5$ wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$; and
crushing the glass-ceramic to provide the abrasive particles.

12. The method according to claim 11, further comprises grading the abrasive particles to provide a plurality of particles having a specified nominal grade.

13. A method of making an abrasive article, the method comprising:
heat-treating glass to convert at least a portion of the glass to crystalline ceramic and provide glass-ceramic, the glass comprising at least 50 percent by weight $Al_2O_3$, based on the total weight of the glass, REO, $ZrO_2$, and at least one of $Nb_2O_5$ or $Ta_2O_5$ wherein the glass contains not more than 10 percent by weight collectively $As_2O_3$, $B_2O_3$, $GeO_7$, $P_2O_5$, $SiO_2$, $TeO_2$, and $V_2O_5$ based on the total weight of the glass, and wherein the at least one of $Nb_2O_5$ or $Ta_2O_5$, is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$;

crushing the glass-ceramic to provide abrasive particles; and incorporating the abrasive particles into an abrasive article.

14. The method according to claim 1, wherein the glass-ceramic has an average hardness of at least 15 GPa.

15. The method according to claim 1, wherein the glass-ceramic has an average hardness of at least 17 GPa.

16. The method according to claim 1, wherein the glass-ceramic has an average hardness of at least 18 GPa.

17. The method according to claim 1, wherein the glass-ceramic has an average hardness of at least 19 GPa.

18. The method according to claim 2, wherein the at least one of $Nb_2O_5$ or $Ta_2O_5$ is present in an amount sufficient to increase the rate of crystalline $ZrO_2$ formation from the glass by at least a factor of 1.5 as compared to the comparative glass-ceramic.

19. The method according to claim 2, wherein the at least one of $Nb_2O_5$ or $Ta_2O_5$ is present in an amount sufficient to increase the rate of crystalline $ZrO_2$ formation from the glass by at least a factor of 2 is compared to the comparative glass-ceramic.

20. The method according to claim 2, wherein the at least one of $Nb_2O_5$ or $Ta_2O_5$ is present in an amount sufficient to increase the rate of crystalline $ZrO_2$ formation from the glass by at least a factor of 3 as compared to the comparative glass-ceramic.

21. A method of abrasive particles, the method comprising:

heat-treating, glass to convert at least a portion of the glass to crystalline ceramic and provide glass-ceramic, the glass comprising at least 40 percent by weight $Al_2O_3$ based on the total weight of the glass, REO, at least 20 percent by weight $ZrO_2$, based on the total weight of the glass, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$ and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner. the same glass free of $Nb_2O_5$ and $Ta_2O_5$; and crushing the glass-ceramic to provide the abrasive particles.

22. The method according to claim 21, further comprises grading the abrasive particles to provide a plurality of particles having a specified nominal grade.

23. A method of making an abrasive article, the method comprising:

heat-treating glass to convert at least a portion of the glass to crystalline ceramic and provide glass-ceramic, the glass comprising at least 40 percent by weight $Al_2O_3$, based on the total weight of the glass, REO, at least 20 percent by weight $ZrO_2$, based on the total weight of the glass, and at least one of $Nb_2O_5$ or $Ta_2O_5$, wherein the class contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$, formation from the glass as compared to a comparative glass-ceramic made by heat-treating, in the same manner, the same glass free of $Nb_2O_5$ and $Ta_2O_5$;

crushing the glass-ceramic to provide the abrasive particles; and incorporating the abrasive particles into an abrasive article.

24. The method according to claim 2, wherein the glass-ceramic has an average hardness of at least 15 GPa.

25. The method according to claim 2, wherein the glass-ceramic has an average hardness of at least 18 GPa.

26. The method according to claim 2, wherein the glass-ceramic has an average hardness of at least 19 GPa.

27. The method according to claim 3, wherein the at least one of $Nb_2O_5$ or $Ta_2O_5$ is present in an amount sufficient to increase the rate of crystalline $ZrO_2$ formation from the glass by at least a factor of 1.5 as compared to the comparative glass-ceramic.

28. The method according to claim 3, wherein the at least one of $Nb_2O_5$ or $Ta_2O_5$ is present in an amount sufficient to increase the rate of crystalline $ZrO_2$ formation from the glass by at least a factor of 2 as compared to the comparative glass-ceramic.

29. The method according to claim 3, wherein the at least one of $Nb_2O_5$ or $Ta_2O_5$ is present in an amount sufficient to increase the rate of crystalline $ZrO_2$ formation from the glass by at least a factor of 3 as compared to the comparative glass-ceramic.

30. The method according to claim 3, wherein the REO is at least one of $Gd_2O_3$, $La_2O_3$, or $Nd_2O_3$.

31. A method of making abrasive particles, the method comprising:

heat-treating glass to convert at least a portion of the glass to crystalline ceramic and provide glass-ceramic, the glass comprising at least 50 percent by weight $Al_2O_3$, at least 30 percent by weight REO, and at least 10 percent by weight $ZrO_2$, based on the total weight of the glass, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$; and crushing the glass-ceramic to provide the abrasive particles.

32. The method according to claim 31, further comprises grading the abrasive particles to provide a plurality of particles having a specified nominal grade.

33. A method of making an abrasive article, the method of comprising:

heat-treating glass to convert at least a portion of the glass to crystalline ceramic and provide lass-ceramic, the glass comprising at least 50 percent bv weight $Al_2O_3$, at least 30 percent by weight REO, and at least 10 percent by weight $ZrO_2$ based on the total weight of the glass, and at least one of $Nb_2O_5$ or $Ta_2O_5$, wherein the glass contains not more than 10 percent by weight collectively $As_2O_3$, $B_2O_3$, $GEO_2$, $P_2O_5$, $SiO_2$, $TeO_2$, and $V_2O_5$, based on the total weight of the glass, and wherein the at least one of $Nb_2O_5$ is present in an amount sufficient to increase the rate of crystalline $ZrO_2$ formation from the glass as compared to a comparative glass-ceramic made by heat-treatin, in the same manner, the same glass free of $Nb_2O_5$ and $Ta_2O_5$; and crushing the glass-ceramic to provide abrasive particles; and incorporating the abrasive particles into an abrasive article.

34. The method according to claim 3, wherein the glass-ceramic has an average hardness of at least 15 GPa.

35. The method according to claim 3, wherein the glass-ceramic has an average hardness of at least 18 GPa.

36. The method according to claim 3, wherein the glass-ceramic has an average hardness of at least 19 GPa.

37. The method according to claim 4, wherein the at least one of $Nb_2O_5$ or $Ta_2O_5$ is present in an amount sufficient to increase the rate of crystalline $ZrO_2$ formation from the glass by at least a factor of 1.5 as compared to the comparative glass-ceramic.

38. The method according to claim 4, wherein the at least one of $Nb_2O_5$ or $Ta_2O_5$ is present in an amount sufficient to increase the rate of crystalline $ZrO_2$ formation from the glass by at least a factor of 2 as compared to the comparative glass-ceramic.

39. The method according to claim 4, wherein the at least one of $Nb_2O_5$ or $Ta_2O_5$ is present in an arnount sufficient to increase the rate of crystalline $ZrO_2$ formation from the glass by at least a factor of 3 as compared to the comparative glass-ceramic.

40. The method according to clain 4, wherein the REO is at least one of $Gd_2O_3$, $La_2O_3$, or $Nd_2O_3$.

41. The method according to claim 4, further comprises grading the glass-ceramic abrasive particles to provide a plurality of particles having a specified nominal grade.

42. A method of making an abrasive article, the method comprising:

heat-treating glass particles to convert at least a portion of the glass to crystalline ceramic to provide glass-ceramic abrasive particles, the class comnprising at least 50 percent by weight $Al_2O_3$, based on the total weight of the glass, REO, $ZrO_2$, and at least one of $Nb_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$ and $Ta_2O_5$; and incorporating the glass-ceramic abrasive particles into an abrasive article.

43. The method according to claim 4, wherein the glass-ceramic abrasive particles have an average hardness of at least 17 GPa.

44. The method according to claim 4, wherein the glass-ceramic abrasive particles have an average hardness of at least 18 GPa.

45. The method according to claim 4, wherein the glass-ceramic abrasive particles have an average hardness of at least 19 GPa.

46. The method according to claim 5, wherein the at least one of $Nb_2O_5$ or $Ta_2O_5$ is present in an amount sufficient to increase the rate of crystalline $ZrO_2$ formation from the glass by at least a factor of 1.5 as compared to the comparative glass-ceramic.

47. The method according to claim 5, wherein the at least one of $Nb_2O_5$ or $Ta_2O_5$ is present in an amount sufficient to increase the rate of crystalline $ZrO_2$ formation from the glass by at least a factor of 2 as compared to the comparative glass-ceramic.

48. The method according to claim 5, wherein the at least one of $Nb_2O_5$ or $Ta_2O_5$ is present in an amount sufficient to increase the rate of crystalline $ZrO_2$ formation from the glass by at least a factor of 3 as compared to the comparative glass-ceramic.

49. The method according to claim 5, wherein the REO is at least one of $Gd_2O_3$, $La_2O_3$, $Nd_2O_3$.

50. The method according to claim 49, further comprises grading the glass-ceramic abrasive particles to provide a plurality of particles having a specified nominal grade.

51. A method of making an abrasive article, the method comprising:

heat-treating glass particles to convert at least a portion of the glass to crystalline ceramic to provide glass-ceramic abrasive particles, the glass comprising at least 35 percent by weight $Al_2O_3$, based on the total weight of the glass, REO, at least 20 percent by weight $ZrO_2$, based on the total weight of the glass, and at least one of $Nb_2O_5$ or $Ta_2O_5$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and wherein the at least one of $Nb_2O_5$ or $Ta_2O_5$ is present in an amount sufficient to increase the rate of crystalline $ZrO_2$ formation from the glass as compared to a comparative glass-ceramic made by heat-treating, in the same manner, the same glass free of $Nb_2O_5$, and $Ta_2O_5$; and incorporating the glass-ceramic abrasive particles into an abrasive article.

52. The method according to claim 5, wherein the glass-ceramic abrasive particles have an average hardness of at least 18 GPa.

53. The method according to claim 5, wherein the glass-ceramic abrasive particles have an average hardness of at least 19 GPa.

54. The method according to claim 6, wherein the at least one of $Nb_2O_5$ or $Ta_2O_5$ is prescnt in an amount sufficient to increase the rate of crystalline $ZrO_2$ formation from the glass by at least a factor of 1.5 as compared to the comparative glass-ceramic.

55. The method according to claim 6, wherein the at least one of $Nb_2O_5$ or $Ta_2O_5$ is present in an amount sufficient to increase the rate of crystalline $ZrO_2$ formation from the glass by at least a factor of 2 as compared to the comparative glass-ceramic.

56. The method according to claim 6, wherein the at least one of $Nb_2O_5$ or $Ta_2O_5$ is present in an amount sufficient to increase the rate of crystalline $ZrO_2$ formation from the glass by at least a factor of 3 as compared to the comparative glass-ceramic.

57. The method according to claim 6, wherein the REO is at least one of $Gd_2O_3$, $La_2O_3$, or $Nd_2O_3$.

58. The method according to claim 6, further comprises grading the glass-ceramic abrasive particles to provide a plurality of particles having a specified nominal grade.

59. A method of making an abrasive article, the method comprising:

heat-treating glass particles to convert at least a portion of the glass to crystalline ceramic to provide glass-ceramic abrasive particles, the glass comprising at least 50 percent by weight $Al_2O_3$, at least 30 percent by weight REO, at least 10 percent by weight $ZrO_2$, based on the total weight of the glass, and at least one of Nb$_2$O$_5$ or Ta$_2$O$_5$, wherein the glass contains not more than 10 percent by weight collectively As$_2$O$_3$, GeO$_2$, P$_2$O$_5$, SiO$_2$, TeO$_2$, and V$_2$O$_5$, based on the total weight of the glass, and wherein the at least one of Nb$_2$O$_5$ or Ta$_2$O$_5$ is present in an amount sufficient to increase the rate of crystalline ZrO$_2$ formation from the glass as compared to a comparative glass-ceramic made by heat-treating, in the same manner, the same glass free of Nb$_2$O$_5$ and Ta$_2$O$_5$; and incorporating the glass-ceramic abrasive particles into an abrasive article.

60. The method according to claim 6, wherein the glass-ceramic abrasive particles have an average hardness of at least 18 GPa.

61. The method according to claim 6, wherein the glass-ceramic abrasive particles have an average hardness of at least 19 GPa.

* * * * *

UNITED STATES PATENT AND TRADEMARK OFFICE
CERTIFICATE OF CORRECTION

PATENT NO. : 7,297,171 B2
APPLICATION NO. : 10/666615
DATED : November 20, 2007
INVENTOR(S) : Anatoly Z. Rosenflanz It is certified that error appears in the above-identified patent and that said Letters Patent is hereby corrected as shown below:

Title Page, Column 1
Section (54), Line 3 of the Title, delete "$NB_2O_5$" and insert -- $NB_2O_5$ --, therefor.

Title Page, Column 2
Under "Other Publications", line 4, delete "Internet" and insert -- Interface --, therefor.
Under "Other Publications", line 17, after "Interactive" insert -- Internet --.

Title Page 3, Column 2
Under "Foreign Patent Documents", line 51, delete "RU" and insert -- SU --, therefor.

Title Page 4, Column 1
Under "Other Publications", line 3, delete "ptg.djnr.com/ccroot/asp/publib/story,asp";" and insert -- ptg.djnr.com/ccroot/asp/publib/story.asp"; --, therefor.
Under "Other Publications", line 15, delete "Feb. 2, 1999," and insert -- Feb. 4, 1999, --, therefor.
Under "Other Publications", line 28, after "5245," insert -- 5251, --.
Under "Other Publications", line 30, delete "152," and insert -- 125, --, therefor.
Under "Other Publications", line 46, delete "pp." and insert -- p. --, therefor.
Under "Other Publications", line 58, after "(1970)" insert -- , pp. --.

Title Page 4, Column 2
Under "Other Publications", line 24, delete "$REA1O_3$" and insert -- $REAlO_3$ --, therefor.
Under "Other Publications", line 61, delete ""Fundamentsal" and insert
-- "Fundamentals --, therefor.

Title Page 5, Column 1
Under "Other Publications", line 7, delete "composited" and insert -- "composites --, therefor.
Under "Other Publications", line 56, delete "Particles,"filed" and insert -- "Particles", filed --, therefor.

Title Page 5, Column 2
Under "Other Publications", line 57, delete "Particles,"filed" and insert -- "Particles", filed --, therefor.
Under "Other Publications", line 67, delete ""Power" and insert -- "Powder --, therefor.

UNITED STATES PATENT AND TRADEMARK OFFICE
CERTIFICATE OF CORRECTION

PATENT NO.         : 7,297,171 B2
APPLICATION NO. : 10/666615
DATED                  : November 20, 2007
INVENTOR(S)        : Anatoly Z. Rosenflanz It is certified that error appears in the above-identified patent and that said Letters Patent is hereby corrected as shown below:

Column 1
In the Title, line 3, delete "$NB_2O_5$" and insert -- $NB_2O_5$ --, therefor.

Column 2
Line 8, after "3", insert -- ) --.
Line 63, delete "$CeAl_{O18}$," and insert -- $CeAl_{11}O_{18}$, --, therefor.

Column 3
Line 1, delete "$Al_2O_3$ $Y_2O_3$" and insert -- $Al_2O_3.Y_2O_3$ --, therefor.
Line 4, delete "$Al_2O_3$ REO"" and insert -- $Al_2O_3$.REO" --, therefor.
Line 29, delete "$Al_2O_3$ metal" and insert -- $Al_2O_3$.metal --, therefor.
Line 40, delete "$Al_2O_3$ metal" and insert -- $Al_2O_3$.metal --, therefor.

Column 6
Line 38, delete "$Al_2O_3$ metal" and insert -- $Al_2O_3$.metal --, therefor.

Column 7
Line 9, delete "$Hfo_2$" and insert -- $HfO_2$ --, therefor.
Line 29, delete "$Y_2O_3$ metal" and insert -- $Y_2O_3$.metal --, therefor.

Column 9
Line 28, delete "SiO2," and insert -- $SiO_2$, --, therefor.
Line 50, delete "can. be" and insert -- can be --, therefor.

Column 11
Line 12, delete "$T_x$," and insert -- $T_x$ --, therefor.

Column 12
Line 14, delete "$T_x$," and insert -- $T_x$ --, therefor.

Column 13
Line 37, before "least" delete "at".

Column 14
Line 11, delete "Tx" and insert -- $T_x$ --, therefor.

Column 22
Line 52, delete "tetrafluoroboate," and insert -- tetrafluoroborate, --, therefor.

UNITED STATES PATENT AND TRADEMARK OFFICE
CERTIFICATE OF CORRECTION

PATENT NO. : 7,297,171 B2
APPLICATION NO. : 10/666615
DATED : November 20, 2007
INVENTOR(S) : Anatoly Z. Rosenflanz It is certified that error appears in the above-identified patent and that said Letters Patent is hereby corrected as shown below:

Column 25
Line 48, delete ""APA-0.5"from" and insert -- "APA-0.5" from --, therefor.

Column 26
Line 28, delete "Table 26," and insert -- Table 2, --, therefor.

Column 28
Lines 37-38, delete "diffractometer (obtained" and insert -- diffractometer obtained --, therefor.

Column 30
Line 32, delete "Ratio-$I_p/I_c$" and insert -- Ratio = $I_p/I_c$ --, therefor.

Column 31
Line 22, in claim 2, delete "sample" and insert -- same --, therefor.
Line 23, in claim 2, delete "$Ta_2O$." and insert -- $Ta_2O_5$. --, therefor.

Column 32
Line 9, in claim 6, delete "$AS_2O_3$," and insert -- $As_2O_3$, --, therefor.
Line 21, in claim 8, after "least" insert -- one --.
Line 39, in claim 11, after "$Nb_2O_5$" insert -- or $Ta_2O_5$, --.
Line 59, in claim 13, after "$Ta_2O_5$" insert -- , --.
Line 61, in claim 13, delete "$GeO_7$," and insert -- $GeO_2$, --, therefor.
Line 66, in claim 13, delete "madc" and insert -- made --, therefor.

Column 33
Line 22, in claim 19, delete "is" and insert -- as --, therefor.
Line 31, claim 21, delete "heat-treating," and insert -- heat-treating --, therefor.
Line 44, claim 21, delete "manner." and insert -- manner, --, therefor.
Line 59, claim 23, delete "class" and insert -- glass --, therefor.
Line 64, claim 23, after "$ZrO_2$" delete ",".

Column 34
Line 54, claim 33, after "method" delete "of".
Line 57, claim 33, delete "lass-ceramic," and insert -- glass-ceramic --, therefor.
Line 58, claim 33, delete "bv" and insert -- by --, therefor.
Line 60, claim 33, after "$ZrO_2$" insert -- , --.
Line 61, claim 33, delete "$Nb_2O_5$or" and insert -- $Nb_2O_5$ or --, therefor.
Line 63, claim 33, delete "$GEO_2$," and insert -- $GeO_2$, --, therefor.
Line 65, claim 33, after "$Nb_2O_5$" insert -- or $Ta_2O_5$ --.

UNITED STATES PATENT AND TRADEMARK OFFICE
CERTIFICATE OF CORRECTION

PATENT NO. : 7,297,171 B2
APPLICATION NO. : 10/666615
DATED : November 20, 2007
INVENTOR(S) : Anatoly Z. Rosenflanz It is certified that error appears in the above-identified patent and that said Letters Patent is hereby corrected as shown below:

Column 35
Line 1, claim 33, delete "heat-treatin," and insert -- heat-treating, --, therefor.
Line 25, claim 39, delete "arnount" and insert -- amount --, therefor.
Line 29, claim 40, delete "clain" and insert -- claim --, therefor.
Line 38, claim 42, delete "comnprising" and insert -- comprising --, therefor.

Column 36
Line 31, claim 51, after "$Nb_2O_5$" delete ",".
Line 41, claim 54, delete "prescnt" and insert -- present --, therefor.

Column 37
Line 3, claim 59, after "$As_2O_3$," insert -- $B_2O_3$, --.

Signed and Sealed this

Twentieth Day of October, 2009

David J. Kappos
*Director of the United States Patent and Trademark Office*